United States Patent
Kuroyanagi et al.

(10) Patent No.: US 7,185,413 B2
(45) Date of Patent: Mar. 6, 2007

(54) MOTOR MANUFACTURING METHOD

(75) Inventors: Tooru Kuroyanagi, Anjo (JP);
Tsuyoshi Yamaguchi, Anjo (JP);
Shingo Hashimoto, Anjo (JP)

(73) Assignee: Aisin Aw Co., Ltd., Anjo (JP)

( * ) Notice: Subject to any disclaimer, the term of this patent is extended or adjusted under 35 U.S.C. 154(b) by 410 days.

(21) Appl. No.: 10/433,048

(22) PCT Filed: Jul. 30, 2002

(86) PCT No.: PCT/JP02/07751

§ 371 (c)(1),
(2), (4) Date: Jun. 12, 2003

(87) PCT Pub. No.: WO03/012963

PCT Pub. Date: Feb. 13, 2003

(65) Prior Publication Data

US 2004/0068858 A1    Apr. 15, 2004

(30) Foreign Application Priority Data

Jul. 31, 2001 (JP) .............................. 2001-232571

(51) Int. Cl.
*H02K 15/00* (2006.01)
(52) U.S. Cl. .............................. 29/596; 29/598; 29/605; 29/606; 29/732; 29/734; 29/736; 140/92.1
(58) Field of Classification Search ............... 29/596, 29/598, 505, 606, 732, 734, 736; 140/92.1
See application file for complete search history.

(56) References Cited

U.S. PATENT DOCUMENTS 3,685,118 A * 8/1972 Payne et al. .................. 29/732
4,750,258 A * 6/1988 Anderson .................... 29/596

FOREIGN PATENT DOCUMENTS

| JP | A 51-138803 | 11/1976 |
|----|-------------|---------|
| JP | A 55-94567  | 7/1980  |
| JP | A 56-19363  | 2/1981  |
| JP | A 58-46850  | 3/1983  |
| JP | A 63-1349   | 1/1988  |
| JP | A 9-9588    | 1/1997  |

* cited by examiner

*Primary Examiner*—A. Dexter Tugbang
*Assistant Examiner*—Tim Phan
(74) *Attorney, Agent, or Firm*—Oliff & Berridge, PLC

(57) ABSTRACT

A motor manufacturing method includes: a coil formation step of forming a unipolar coil, having coil inserting portions at two positions and coil end portions at two positions, in to a shape that changes such that a size in a height direction parallel to the coil inserting portion is larger in an inner peripheral side corresponding to a diametrical direction of a motor core along a direction of a winding axis center, than in an outer peripheral side; and a coil insertion step of disposing the unipolar coil in such a manner that the coil inserting portions in the unipolar coil respectively face toward inner peripheral opening portions of slots and are substantially parallel to an axial direction of the motor core, and inserting the coil inserting portions of the unipolar coil into the slots by moving the unipolar coil toward the motor core substantially linearly, while holding the motor core such that protrusion dimensions at both ends protruding from both end surface positions in an axial direction of the motor core are maintained substantially the same.

25 Claims, 31 Drawing Sheets

MOTOR MANUFACTURING METHOD

CROSS-REFERENCE TO RELATED APPLICATION

This Application is the U.S. National Stage of International Application No. PCT/JP02/07751, filed Jan. 30, 2002, which claims priority from Japanese Patent Application No. 2001-232571, filed Jul. 31, 2001, the entire disclosures of which are incorporated by reference herein in their entireties by reference thereto.

BACKGROUND OF THE INVENTION

1. Field of Invention

The invention relates to a motor manufacturing method and, more particularly, to a method of inserting a coil into a motor core.

2. Description of Related Art

When manufacturing a motor in which a coil is inserted into a slot of a motor core such as a stator core, a rotor core, or the like, a method of inserting the coil is very important. Accordingly, conventionally, various kinds of methods and apparatuses for inserting the coil have been proposed.

When disposing a group of coils having a plurality of phases in the stator core, it is necessary to overlap a portion of a coil end portion of each of the coils with other respective coils. Accordingly, the coil end portion of each of the coils is deformed outwardly to a substantial degree, in order to avoid the other phases. At this time, when a coil end portion which is longer than necessary exists, the overlapping portion of the deformed coil end portion becomes larger than is necessary.

Protrusion of the coil end portion and the overlapping portion in the coil leads to an increase in a size of an entire part in which the coil is incorporated in the motor coil and, by extension, a size in an axial direction of the entire motor is also increased. This problem occurs in the same manner even in the case that the motor core is a rotor core, in addition to the case described above of the stator core.

SUMMARY OF THE INVENTION

In recent years, adoption of electric motors, hybrid systems, and the like in motor vehicles has been positively considered. There is thus a strong demand for making the axial direction of the motor shorter.

The invention thus provides a motor manufacturing method which can both reduce a protrusion amount of a coil from a motor core, and reduce a length of a motor in an axial direction.

According to a first exemplary aspect of the invention, a method of manufacturing a motor having a ring-shaped motor core provided with a plurality of slots on an inner peripheral surface and coil groups of a plurality of phases, wherein the coil group in each of the phases is structured from a plurality of unipolar coils corresponding to one pole, each of the unipolar coils are inserted and disposed in the motor core by being passed through two of the plurality of slots so as to straddle the two of the plurality of slots, and the unipolar coils belonging to different phases of coil groups are overlapped with each other in portions of respective coil end portions when attached to the motor core, includes forming the unipolar coil, the unipolar coil having two coil inserting portions and having the coil end portions at two positions disposed in an outer portion of the motor core so as to connect the coil inserting portions, into a shape such that a size in a height direction parallel to the coil inserting portions changes so as to be larger in an inner peripheral side, corresponding to a diametrical direction of the motor core along a direction of a winding axis center, than an outer peripheral side by winding a wire a plurality of times disposing the unipolar coil such that the two coil inserting portions in the unipolar coil respectively face toward inner peripheral opening portions of the two of the plurality of slots and are substantially parallel to an axial direction of the motor core and inserting the two coil inserting portions of the unipolar coil into the two of the plurality of slots by moving the unipolar coil toward the motor core substantially linearly while holding the motor core so that protrusion dimensions at both ends protruding from both end surface positions in the axial direction of the motor core are maintained substantially the same.

In forming the unipolar coil, formation is executed of a unipolar coil formed with a shape such that the size in the height direction parallel to the coil inserting portion of the inner peripheral side corresponding to the diametrical direction of the motor core along the axial direction is changed so as to be larger than that of the outer peripheral side. That is, in contrast to the conventional unipolar coil in which the shape is hardly changed along the direction of a winding axis, the shape of the coil is changed along the direction of winding axis. Accordingly, it is possible to form a unipolar coil having an optimal shape with respect to overlap of the portions of the coil end portions in the unipolar coils having different phases from each other.

Further, when inserting the unipolar coil, the unipolar coil is moved in the substantially linear fashion while holding the unipolar coil so that the protrusion dimensions at the both ends are maintained substantially the same. Accordingly, not only it is possible to carry out a linear inserting process based on a linear movement, but it is also possible for the lengths of the coil end portions respectively protruding from both end surfaces of the motor core to be substantially the same following insertion. Therefore, the coil end portions protruding from both end surfaces can be adjusted to a minimum length which is optimal with respect to overlap with the coil end portions of other phases. Accordingly, it is possible to reduce a length in an axial direction of a part in which the coil is incorporated and attached to the motor core, and by extension it is possible to reduce a length in an axial direction of the entire motor.

According to a second exemplary aspect of the invention, a method of manufacturing a motor having a ring-shaped motor core provided with a plurality of slots on an inner peripheral surface and coil groups of a plurality of phases, wherein the coil group in each of the phases is structured from a plurality of unipolar coils corresponding to one pole, each of the unipolar coils are inserted and disposed in the motor core by being passed through two of the plurality of slots so as to straddle the two of the plurality of slots, and the unipolar coils belonging to different phases of coil groups are overlapped with each other in portions of respective coil end portions when attached to the motor core includes forming the unipolar coil, the unipolar coil having two coil inserting portions and having the coil end portions at two positions disposed in an outer portion of the motor core so as to connect the coil inserting portions, into a shape such that a size in a height direction parallel to the coil inserting portions is larger in an inner peripheral side, corresponding to a diametrical direction of the motor core along a direction of a winding axis center, than an outer peripheral side by winding a wire a plurality of times, inserting the two coil inserting portions of the unipolar coil into the two of the plurality of slots and inserting a positioning apparatus between both end surfaces in an axial direction of the motor core and the coil end portions in order to align protrusion dimensions at both ends protruding from both end surfaces in the axial direction of the motor core and the unipolar coil so as to be substantially the same.

In this case, the unipolar coil is attached to the motor core by carrying out the axial positioning, and as a result, the protrusion dimensions at both ends protruding from both end surfaces in the axial direction of the motor core of the unipolar coil are aligned so as to be substantially the same. Accordingly, the lengths of the coil end portions protruding from both end surfaces of the motor core after being inserted become substantially uniform. Therefore, the coil end portions protruding from both end surfaces can be regulated to a minimum length which is optimal with respect to overlap with the coil end portion of the respective other phase. Thus, it is possible to reduce the length in the axial direction of the part in which the coil is incorporated and attached to the motor core, and by extension is it also possible to reduce the length in the axial direction of the entire motor.

BRIEF DESCRIPTION OF THE DRAWINGS

Various embodiments of the invention will be described with reference to the drawings, wherein.

DETAILED DESCRIPTION OF PREFERRED EMBODIMENTS

Figure 1:
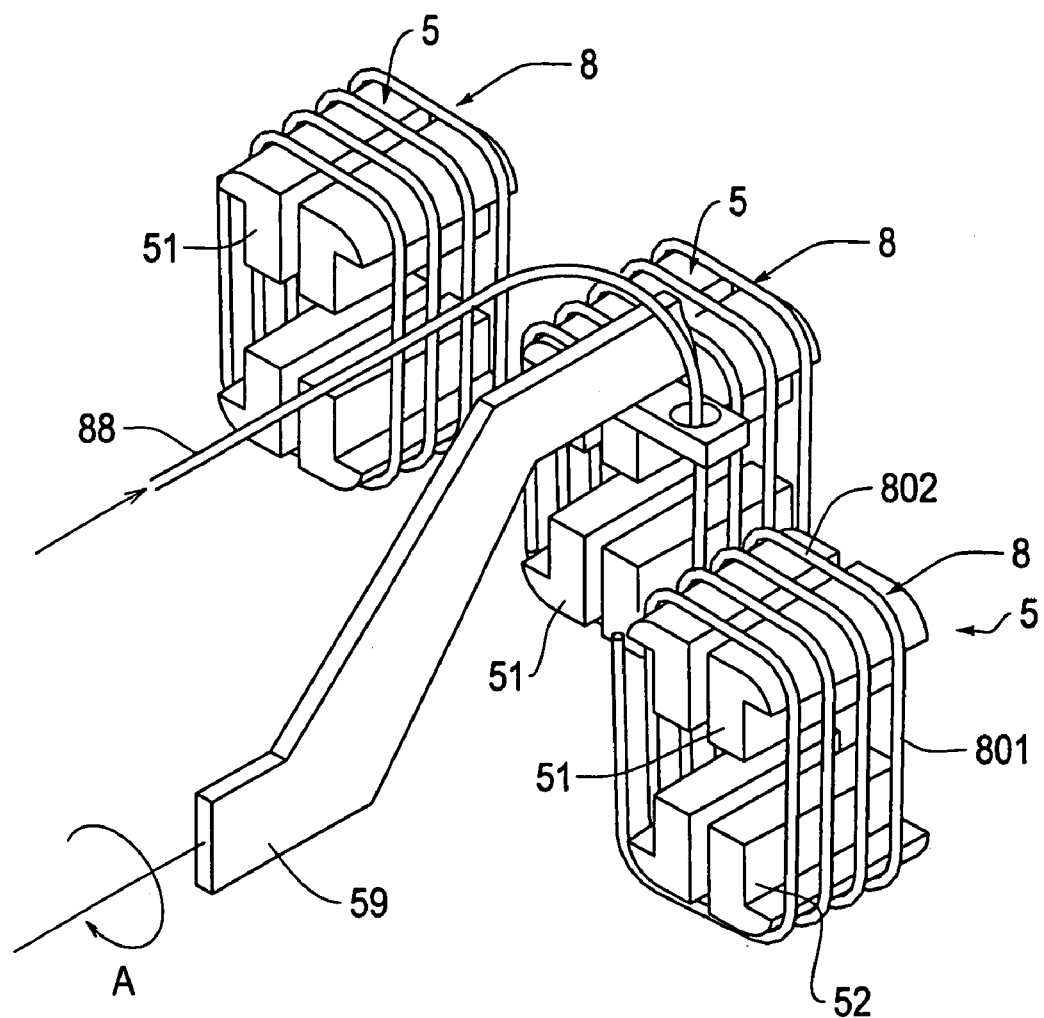
FIG. 1 is an explanatory view showing a state in which a coil is wound around a spool by a winding arm, in accordance with a first embodiment.

In the first exemplary aspect of the invention described above, the coil insertion step is carried out by first holding the unipolar coil by the coil holding mechanism at a time of the coil formation step or after the coil formation step. The unipolar coil is then disposed so that the coil inserting portions respectively face toward the inner peripheral opening portions of the slots and are substantially in parallel to the axial direction of the motor core. The unipolar coil is then moved substantially linearly toward the motor core so as to separate from the coil holding mechanism. In this case, the unipolar coil can be stably moved using the coil holding mechanism, and the unipolar coil can be directly disposed on the motor core without using a so-called bobbin, or the like.

The unipolar coil formed in the coil formation step is formed in a substantially quadrangular shape having four periphery lines constituted by substantially linear portions of the coil inserting portion and the coil end portion as seen from the direction of the winding axis center. Further, it is preferable if the single-pole core has a hypothetical surface formed by connection of the adjacent linear portions of the coil end portions having a taper shape which is inclined with respect to the winding axis center. In this case, it is possible to form parts of the coil inserting portion and the coil end portion in the unipolar coil in a substantially linear shape, and it is possible to facilitate easier execution of the insertion operation into the motor core.

In the coil insertion step described above, it is preferable to use a magazine having a coil holding groove capable of clamping the coil inserting portion of the unipolar coil as the coil holding mechanism, dispose the coil inserting portion of the unipolar coil in the coil holding groove of the magazine, and dispose the magazine in an inner portion of the motor core. Further, at a time of moving the unipolar coil, it is preferable to maintain the protrusion dimensions at the both ends of the unipolar coil substantially the same, owing to a friction force generated between the coil inserting portion and the coil holding groove, due to an elastic force of the coil inserting portion. In this case, it is possible to maintain a position of the unipolar coil by a simple method that utilizes the friction force between the coil holding groove and the unipolar coil of the magazine.

It is preferable that a positioning apparatus supporting the coil end portion of the unipolar coil from an inner side thereof is provided on both surfaces of the magazine, and in the coil insertion step, it is preferable that movement of the unipolar coil is started from a state of maintaining the coil shape by the positioning apparatus. In this case, it is possible to set the position of the unipolar coil at a time of starting the movement in an optimum state, and it is possible to maintain a more accurate dimension state.

It is preferable that the positioning apparatus is provided so as to freely move forward and backward with respect to the magazine, and in the coil insertion step, it is preferable if the shape of the unipolar coil is constantly maintained by the positioning apparatus by moving the positioning apparatus in correspondence to the movement of the unipolar coil. In this case, it is possible to more stably maintain the dimension state of the unipolar coil.

Next, in the second exemplary aspect of the invention described above, the coil insertion step is carried out by holding the unipolar coil by the coil holding mechanism at a time of the coil formation step or after the coil formation step, disposing the unipolar coil so that the coil inserting portions respectively face toward the inner peripheral opening portions of the slots and are substantially in parallel to the axial direction of the motor core, and moving the unipolar coil substantially linearly toward the motor core so as to separate from the coil holding mechanism. In this case, it is possible to stably move the unipolar coil using the coil holding mechanism, and it is possible to directly dispose the unipolar coil on the motor core without using a so-called bobbin, or the like.

In the first exemplary aspect and the second exemplary aspect of the invention, it is preferable that only the unipolar coil is inserted into the slot of the motor core, in the coil insertion step described above. That is, it is preferable to move only the coil instead of moving the whole of the bobbin to the motor core, in a state in which the coil is wound around a so-called bobbin, or the like. Accordingly, it is possible to make a distance between the motor core and each of the coils (the unipolar coils) smaller, which is advantageous for forming an efficient magnetic circuit.

It is preferable that the unipolar coil formed in the coil formation step is formed in a substantially quadrangular shape having four periphery lines constituted by substantially linear portions of the coil inserting portions and the coil end portions as seen from the direction of the winding axis center. Further, it is preferable if the single-pole core has a hypothetical surface formed by connection of the adjacent linear portions of the coil end portions having a taper shape which is inclined with respect to the winding axis center.

It is preferable that the positioning apparatus has a taper shape with the same direction of inclination as that of the taper shape of the unipolar coil. Accordingly, it is possible to more accurately carry out the positioning step in the case that the unipolar coil is formed in the taper shape.

It is preferable that the inclination of the taper shape of the positioning apparatus is larger than the inclination of the taper shape of the unipolar coil. In this case, it becomes possible to execute an operation in which the coil end portion of the unipolar coil attached to the motor core is formed by pressing the coil end portion from an inner peripheral side of the motor core to an outer peripheral side thereof.

In the coil insertion step described above, it is possible to use a magazine, as the coil holding mechanism, having a coil holding groove capable of clamping the coil inserting portion of the unipolar coil and having the positioning jig on both surfaces such that the positioning jig can be moved freely forward and backward. This coil holding mechanism is used to dispose the coil inserting portion of the unipolar coil in the coil holding groove of the magazine, and dispose the magazine in the inner portion of the motor core so as to insert the unipolar coil into the slot of the motor core. Further, the axial positioning step can be carried out by moving the positioning apparatus provided in the magazine so as to bring the positioning apparatus into contact with the unipolar coil. In this case, it is possible to stably move the positioning apparatus along the magazine.

In both of the first exemplary aspect and the second exemplary aspect of the invention described above, it is preferable that the motor core is a stator core. That is, the motor core may be a stator core or a rotor core. However, particularly in the case of the stator core, it is extremely important to make a length in an axial direction compact, which is extremely beneficial for the operation and effect of the present invention.

In the case of using the aforementioned magazine in the coil insertion step, it is preferable to move the unipolar coil from the coil holding groove to the slot of the motor core by bringing a coil insertion mechanism into contact with the unipolar coil so as to move a contact portion forward in a direction from a center of the magazine toward an outer periphery. In this case, it is possible to easily achieve a linear movement of the unipolar coil.

It is preferable that the coil insertion mechanism comprises an insertion blade capable of being inserted into the coil holding groove of the magazine, and that the coil inserting portion is moved from the coil holding groove to the slot of the motor core by inserting the insertion blade into the coil holding groove and moving the insertion blade forward in a direction from a center toward an outer periphery.

That is, the operation is carried out such that a space exists between a bottom portion of the coil holding groove and the coil at a time of attaching the coil to the magazine. Accordingly, it is possible to dispose the insertion blade within the coil holding groove. Further, it is possible to bring the insertion blade into full contact with the coil inserting portion positioned within the coil holding grove, by inserting the insertion blade into the coil holding groove, and it is possible to achieve stable movement of the coil. Moreover, in this case, a timing at which the insertion blade is inserted into the coil holding groove may be any time among a time at which the magazine is disposed in the motor core, a time before, and a time after. Further, it is preferable that the insertion blade is structured so as to be inserted from any one of a front side surface and a back side surface of the magazine. Accordingly, it is possible to simplify a moving mechanism of the insertion blade.

It is preferable that the coil insertion mechanism is constituted by a pair of divided insertion blades that can be inserted into the coil holding groove from the front surface side and the back surface side of the magazine, respectively. Further, it is preferable that the coil inserting portion is moved from the coil holding groove to the slot of the motor core by inserting the pair of divided insertion blades into the coil holding groove from the front surface side and the back surface side of the magazine, respectively, so as to bring the divided insertion blades into contact with the coil inserting portion, and move forward the contact portion in the direction from the center toward the outer periphery. In this case, it is possible to employ a method in which the pair of divided insertion blades are inserted into the coil holding groove from the front and back of the magazine and moved from the center toward the outer periphery. Moreover, it is also possible to employ a method in which a linear movement of the coil is achieved simply by inserting, from upper and lower sides, a pair of divided insertion blades having a taper portion, as will be shown in an embodiment described below.

The coil insertion mechanism may be constituted by a pair of divided insertion hooks which are divided according to the front surface side and the back surface side of the magazine, and the coil inserting portion may be moved from the coil holding groove to the slot of the motor core by bringing the pair of divided insertion hooks into contact with the respective coil end portions protruding toward the front surface side and the back surface side of the magazine, and moving the divided insertion hooks forward from the center of the magazine in the direction toward the outer periphery. In this case, it is not necessary to insert the coil insertion mechanism into the coil holding groove, and it is possible to more simply and stably support the coil from the front and back sides of the magazine.

It is preferable to carry out a preliminary formation step of pressing and deforming the coil end portion by moving forward a preliminary formation mechanism disposed between adjacent coil holding grooves from the center of the magazine in the direction toward the outer periphery, at the same time as or after moving the coil inserting portion from the coil holding groove to the slot. In this case, it is possible to easily carry out a preliminary formation step of outwardly pressing and deforming the coil end portion which is a protruding portion of the coil, by the preliminary formation mechanism, each time a coil is attached to the motor core. Accordingly, the protruding portion is placed near to the surface of the motor core, and it is possible to make the length of the protruding portion in the axial direction smaller. Further, since it is possible to carry out the preliminary forming using the magazine and the preliminary formation mechanism, it is possible to simplify the apparatus and the step.

It is preferable that a preliminary forming groove is provided in the magazine in parallel to the coil holding groove, and a preliminary formation blade which can be inserted into the preliminary forming groove is employed as the preliminary formation mechanism. Moreover, it is preferable that the preliminary formation step is carried out by inserting the preliminary formation blade into the preliminary forming groove such that the preliminary formation blade is moved forward in the direction from the center toward the outer periphery. In this case, it is possible to simplify the apparatus structure based on a combination of the preliminary forming groove and the preliminary formation blade.

The preliminary formation mechanism comprises a pair of divided preliminary formation blades which are divided according to the front surface side and the back surface side of the magazine. The preliminary formation step may also be carried out by moving forward the pair of divided preliminary formation blades on the front surface side and the back surface side of the magazine, from the center of the magazine in the direction toward the outer periphery. In this case, it is possible to stably carry out the preliminary forming from the front and back sides of the coil.

It is preferable that the coil insertion mechanism is constituted by a pair of divided insertion blades which are divided according to the front surface side and the back surface side of the magazine, and that the divided insertion blades and the divided preliminary formation blades are structured so as to interlock. That is, in the case that both of the coil insertion mechanism and the preliminary formation mechanism are divided according to the front and rear surface sides of the magazine, respectively, it is preferable to link, so as to interlock, the respective mechanisms disposed on the same surface side. Accordingly, it is possible to integrate the transfer mechanism of the coil insertion mechanism and the preliminary formation mechanism, and it is possible to simplify the apparatus structure.

It is preferable to carry out a main forming step of forming the coil end portion by pressing a former, which has a forming surface for arranging a desired shape of the coil end portion, into the motor core, after repeating the coil insertion step and the preliminary formation step a plurality of times. In this case, it is possible to form the entire preliminary formed coil into the desired shape at one time simply by pressing the former in to the motor core. Accordingly, it is possible to easily carry out the main forming step. Further, as a result of the main forming step, it is possible to form the coil end portion protruding from the motor core such that the coil end portion comes into proximity with the motor core. Thus, it is possible to further reduce the size in the axial direction.

It is preferable that a notch portion for preventing the coil insertion mechanism and the preliminary formation mechanism from interfering with each other is provided in the former, and that the former is pressed in to the motor core while maintaining a state in which the coil insertion mechanism and the preliminary mechanism are projected. In this case, it is possible to hold the coil in the main forming step of the coil, due to the presence of the coil insertion mechanism and the preliminary formation mechanism, and it is possible to stably carry out the main forming. Further, since it is also possible to continuously carry out the main forming step after the preliminary formation step has been completed, it is possible to facilitate further rationalization of the manufacturing steps.

It is preferable that the motor is a three-phase DC brushless motor, and that the unipolar coils of one phase are simultaneously inserted into the slot of the motor core, in the coil insertion step. In this case, it is possible to handle the coils of one phase at the same time using the magazine. Further, it is possible to handle all of the three phases by shifting a relative position of the magazine and the motor core, and thus it is possible to complete the operation of inserting the coil into the motor core using three operations.

Further, it is possible to employ the winding jig that is used in the coil formation step, as the magazine. That is, in the coil formation step a winding jig may be used that has a base holder and a plurality of spools disposed radially on an outer peripheral surface of the base holder, this winding jig being disposed such that the spools are freely able to move forward and backward with respect to the base holder. The coil formation step includes a spool projection step of projecting one spool among the plurality of spools such that the given spool projects more than the other spools, a winding step of supplying an electric wire to the protruding spool from one direction and rotating the entire winding jig around an axis of the spool so as to wind the electric wire around the spool, thereby forming a unipolar coil and a spool retraction step of retracting the spool forming the unipolar coil.

The spool projection step, the winding step and the spool retraction step are sequentially applied to the adjacent spools repeatedly, and the winding step is carried out by sequentially reversing a rotation direction of the winding jig. In the coil insertion step, the winding jig is used as the magazine, and the winding jig holding the coil is disposed in an inner portion of the motor core, and each of the unipolar coils is directly moved to the slot of the motor core from the spool.

In this case, in the coil formation step, the coil is formed using the winding jig provided radially with a plurality of spools. Further, in the coil insertion step, the winding jig is disposed in the inner portion of the motor core. At this time, since the spools provided in the winding jig are radially disposed as described above, it is easy to face each of the unipolar coils toward the slot in to which it is to be inserted, at a time of disposing the winding jig within the ring-like motor core. Further, accordingly, it is possible to directly move the unipolar coil to the slot of the motor core from the spool, without transferring the unipolar coil from the winding jig to another transfer apparatus, or the like.

In the coil formation step described above, the winding jig having the unique structure with the base holder and the spool is adopted. Further, as described above, the spool projection step, the winding step and the spool retraction step are carried out sequentially. In this case, the winding step is carried out by rotating the entire winding jig around the axis of the protruding spool. Accordingly, as described above, it is possible to supply the electric wire from one direction, and it is not necessary to rotate the electric wire itself as is carried out in the conventional art. Therefore, it is possible to form the unipolar coil in the spool without causing any twisting of the electric wire.

The winding step is carried out after the spool projection step, and the spool retraction step is carried out after the winding step. That is, in the case of changing the spool which is subject to the winding step, it is possible to change the spool by carrying out the projection movement and the retraction movement in the spool projection step and the spool retraction step. It is not necessary for a space for supplying the electric wire to be specially provided between the adjacent spools. Accordingly, it is possible to restrict a length of a crossover wire between the obtained unipolar coils to a sufficiently short length.

It is preferable that the base holder is formed in a disc shape, and that the plurality of spools are disposed so as to be able to move freely forward and backward along an axis extending radially from the center point of the base holder. In this case, when changing the center of rotation for rotating the entire winding jig for each of the spools in the coil formation step, a slight rotation of the entire winding jig around the center point of the base holder is sufficient. Accordingly, it is easy to carry out the operation of changing the center of rotation at a time of changing the spool to be wound.

It is preferable that each of the spools has a fan shape having a width that expands along the axis. In this case, it is possible to make a shape of the unipolar coil formed on each of the spools a shape having a width that expands along the axis. Accordingly, it is possible to easily obtain a coil shape that is suitable for being attached from an inner peripheral surface of the motor core.

It is preferable that each of the spools is detachably provided with a forming block for arranging the shape of the wound unipolar coil. In this case, it is easy to change the shape of the unipolar coil using a forming block having a different shape. Further, the forming block can also fulfill the function of the positioning apparatus described above.

In the winding jig, it is preferable that a visible outline formed by a leading end of the spools when all of the spools are in a retracted state is a circular shape having a center constituted by a center point of the base holder. In this case, when disposing the winding jig in an inner surface side of a ring-shaped motor core, it is possible to reduce a space between the winding jig and the inner surface of the motor core, and it is possible to smoothly move the coil.

It is preferable that separation plates extending from the outer peripheral surface of the base holder are provided on both sides of each of the spools, and that a predetermined space is maintained between the separation plates and the spools. In this case, when the spool is retracted after the unipolar coil is formed on the spool, it is possible to dispose the coil in the space, that is the predetermined space, between the separation plate and the spool, and it is possible to hold the coil in the winding jig in a state in which the coil shape is well maintained.

Hereinafter, a first embodiment of the invention will now be described. A description will be given of a motor manufacturing method in accordance with a first embodiment of the invention with reference to FIGS. 1 to 17.

According to the motor manufacturing method of the present embodiment, a ring-shaped motor core (stator core) 1 (FIGS. 9 to 12) having a plurality of slots 10 in an inner peripheral surface and coil groups having three phases (a W-phase, a V-phase and a W-phase) (FIGS. 16 and 18) are provided. According to the method of manufacturing the motor, the coil group in each of the phases is structured by a plurality of unipolar coils 8 forming one pole. Each of the unipolar coils 8 is disposed by being inserted into the stator core 1 in such a manner as to straddle between two respective slots 10, and the unipolar coils 8 belonging to the coil groups having different phases are such that respective single-poles 8 overlap with each other in portions of respective coil end portions 802, when in a state of being attached to the stator core 1.

Figure 2:
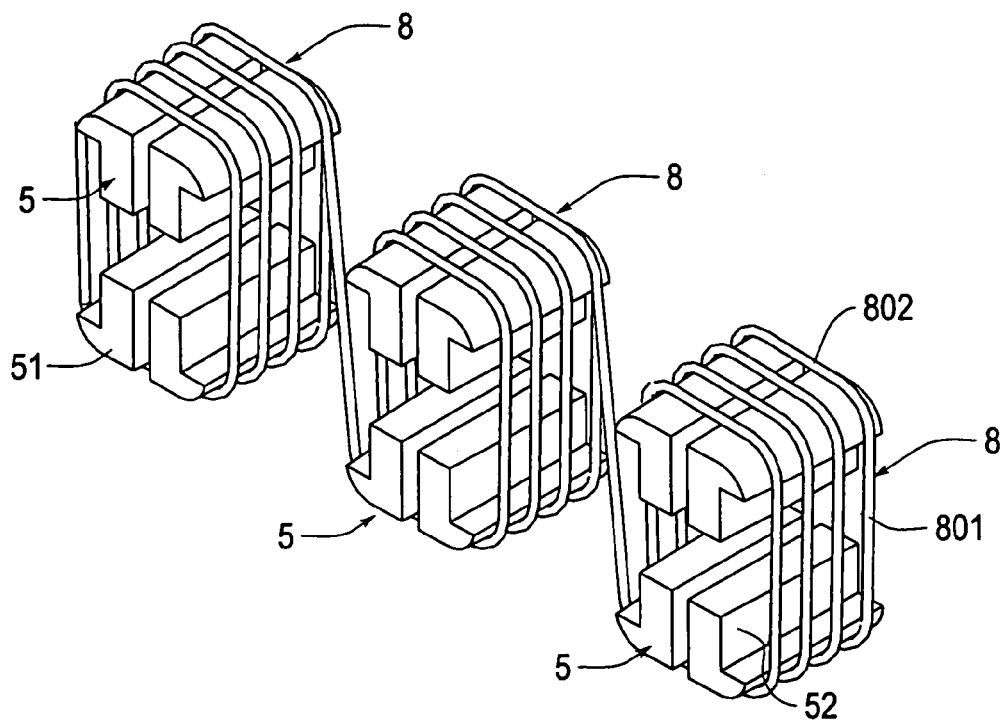
FIG. 2 is an explanatory view showing a state in which forming of three coils is completed, in accordance with the first embodiment.
Figure 3:
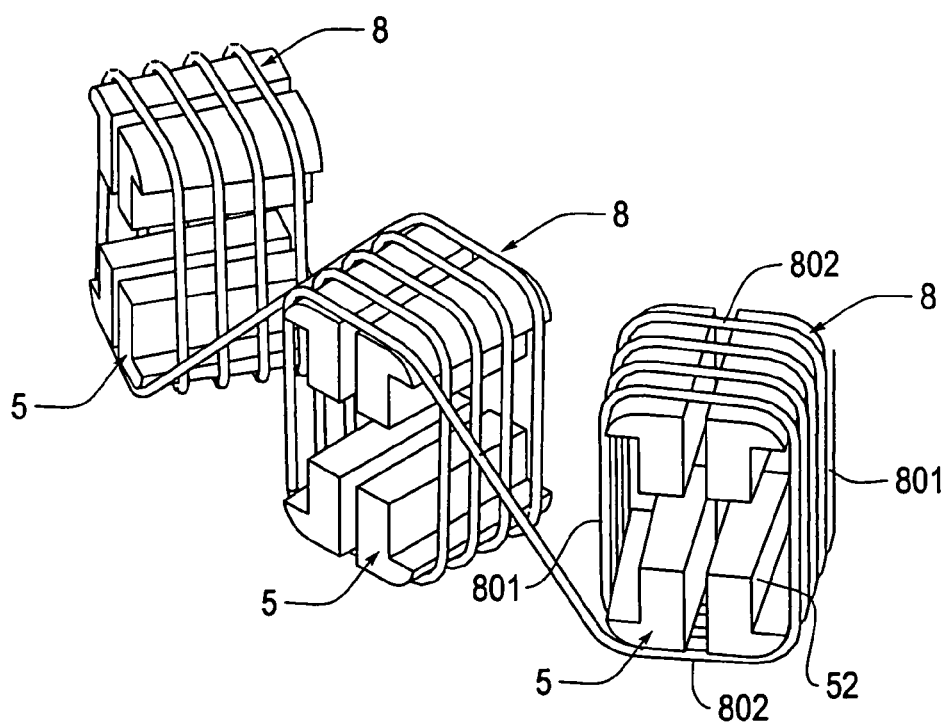
FIG. 3 is an explanatory view showing a state in which shapes of three coils are arranged, in accordance with the first embodiment.

The manufacturing method in accordance with the present embodiment includes a coil formation step and a coil insertion step. The coil formation step is, as shown in FIGS. 1 to 3, a step of forming the unipolar coil 8 which has coil inserting portions 801 at two positions that are inserted into the slot 10 a plurality of times, and coil end portions 802 at two positions that are disposed in an outer portion of the stator core 1 so as to connect the coil inserting portions 801. The unipolar coil 8 is formed into a shape such that a size in a height direction parallel to the coil inserting portion 801 changes such that an inner peripheral side corresponding to a diametrical direction of the motor core along a direction of a winding axis center is larger than an outer peripheral side, by winding an electric wire 88.

Figure 9:
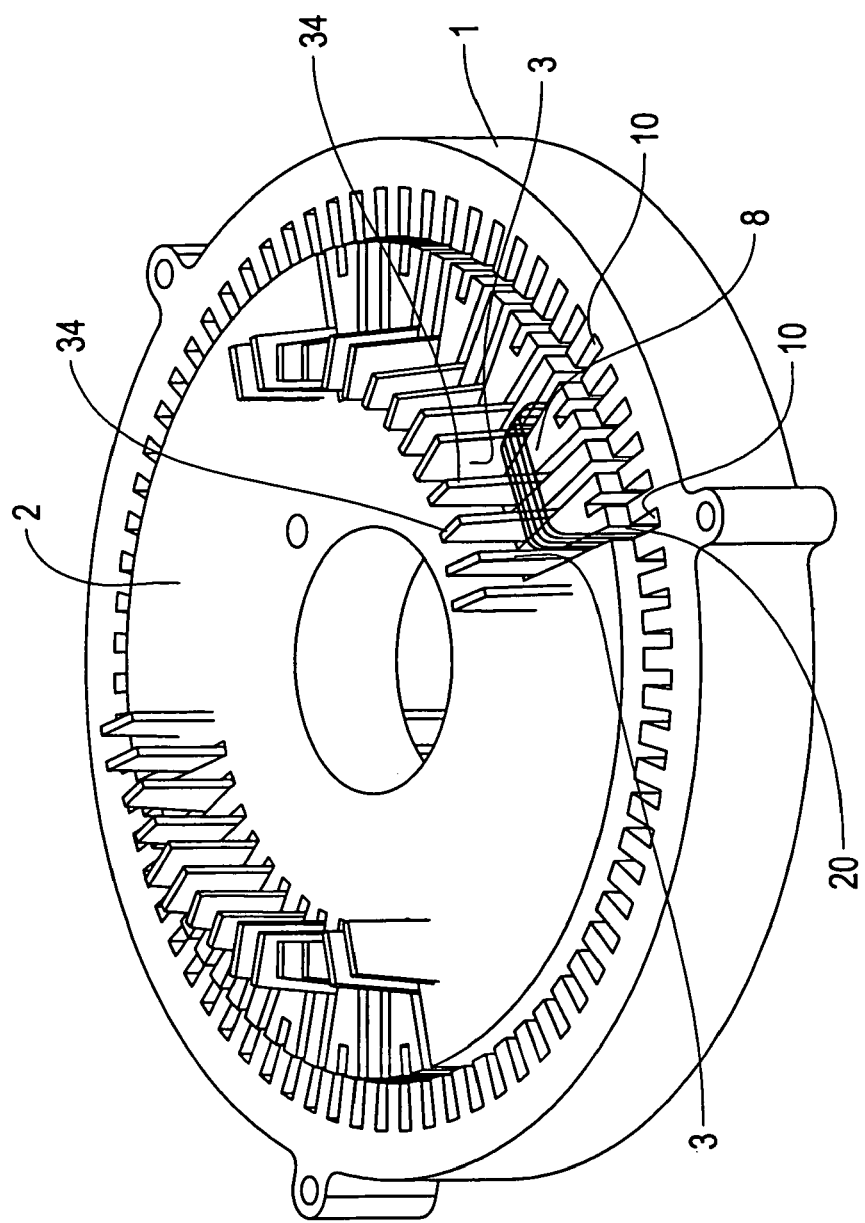
FIG. 9 is an explanatory view showing a state in which the magazine is disposed in an inner portion of the motor core and an insertion blade and a preliminary formation blade are inserted into a groove, in accordance with the first embodiment.
Figure 10:
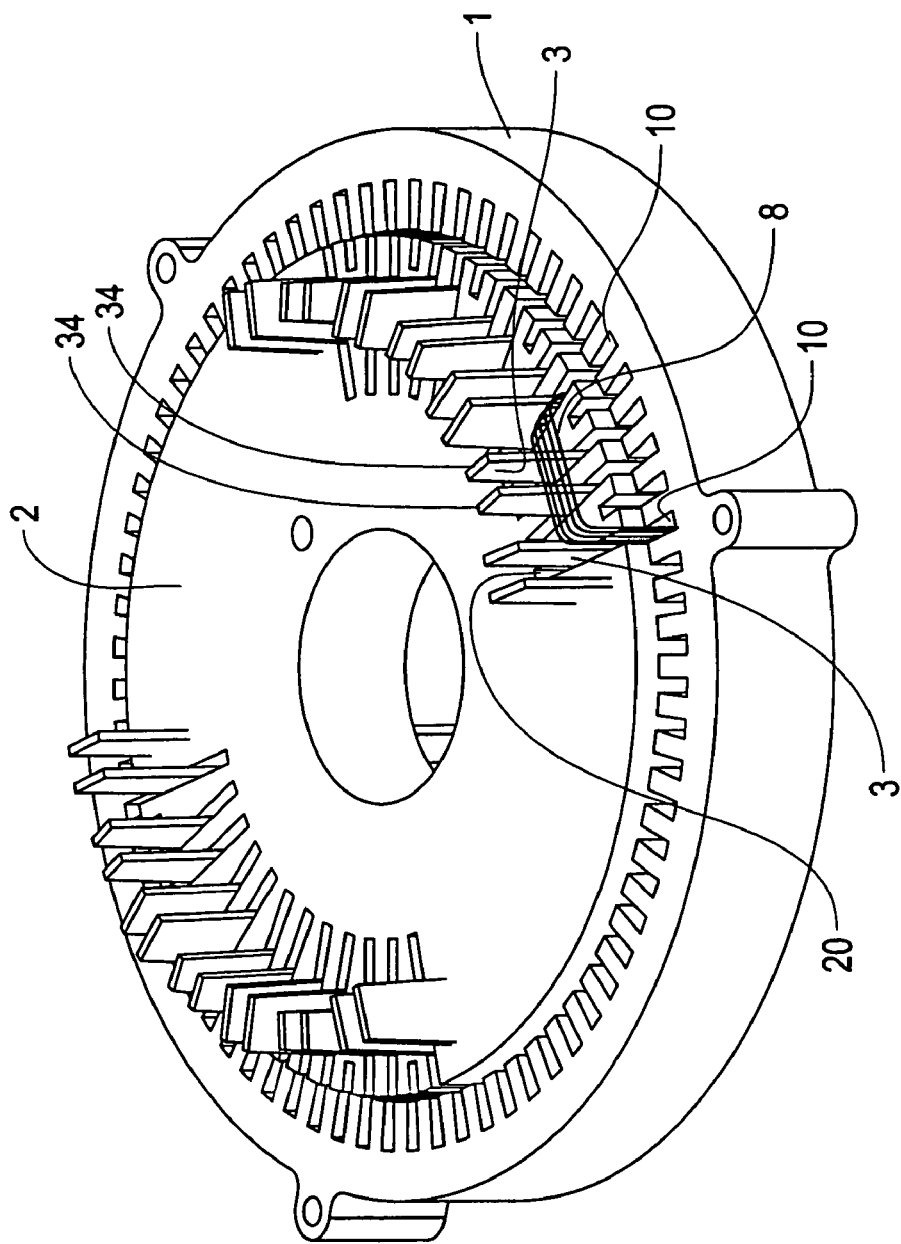
FIG. 10 is an explanatory view showing a state in which the insertion blade and the preliminary formation blade are moved, in accordance with the first embodiment.
Figure 11:
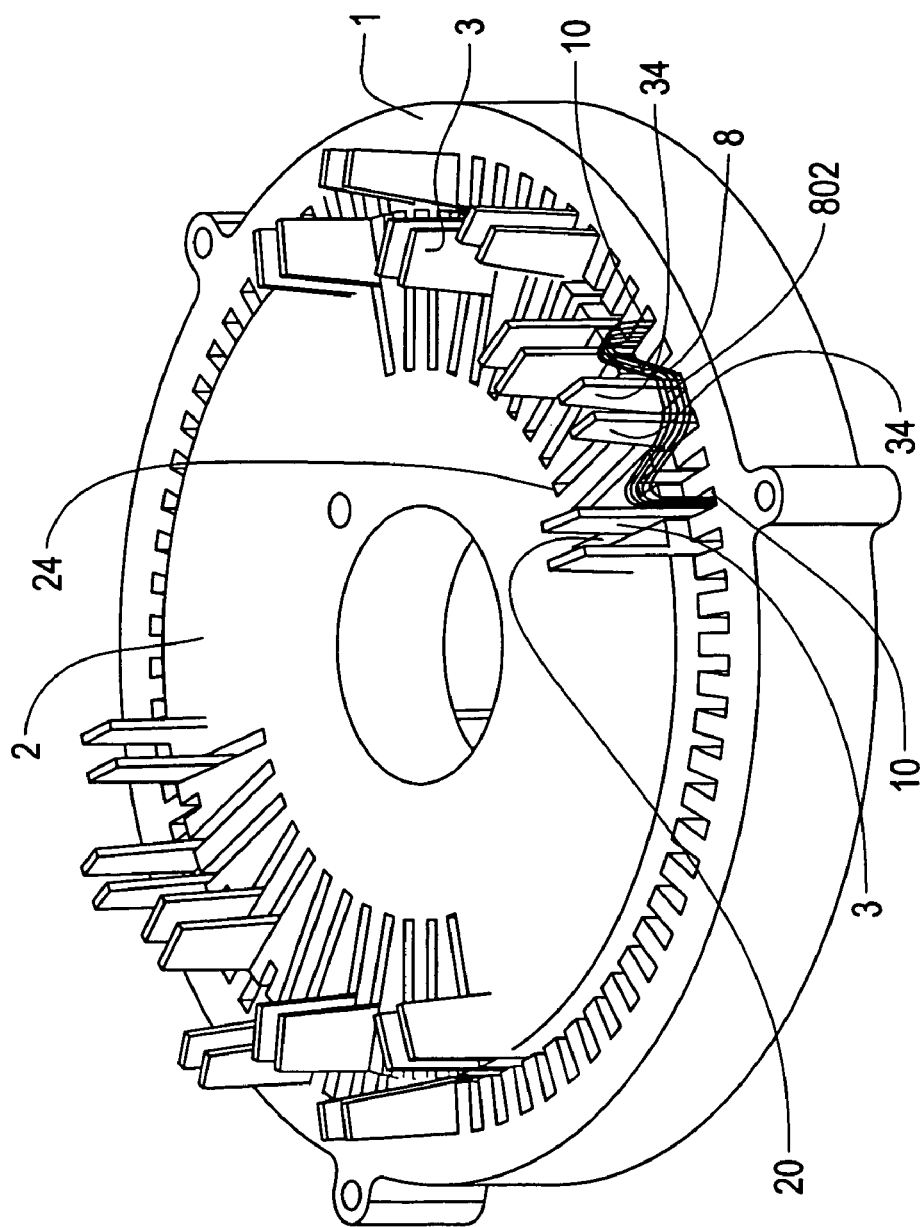
FIG. 11 is an explanatory view showing a state in which the movement of the insertion blade and the preliminary formation blade are completed, in accordance with the first embodiment.

Further, the coil insertion step is, as shown in FIGS. 9 to 11, a step of inserting the coil inserting portion 801 of the unipolar coil 8 into the slot 10 by disposing the unipolar coil 8 such that the two coil inserting portions 801 in the unipolar coil 8 face toward respective inner peripheral opening portions of the slots 10 and become substantially parallel to an axial direction of the stator core 1. The unipolar coil 8 is linearly moved, in a substantially parallel manner, toward the stator core 1 while holding the unipolar coil such that protrusion dimensions of both ends protruding from both end surface positions in the axial direction of the stator core 1 are maintained substantially the same.

Figure 8:
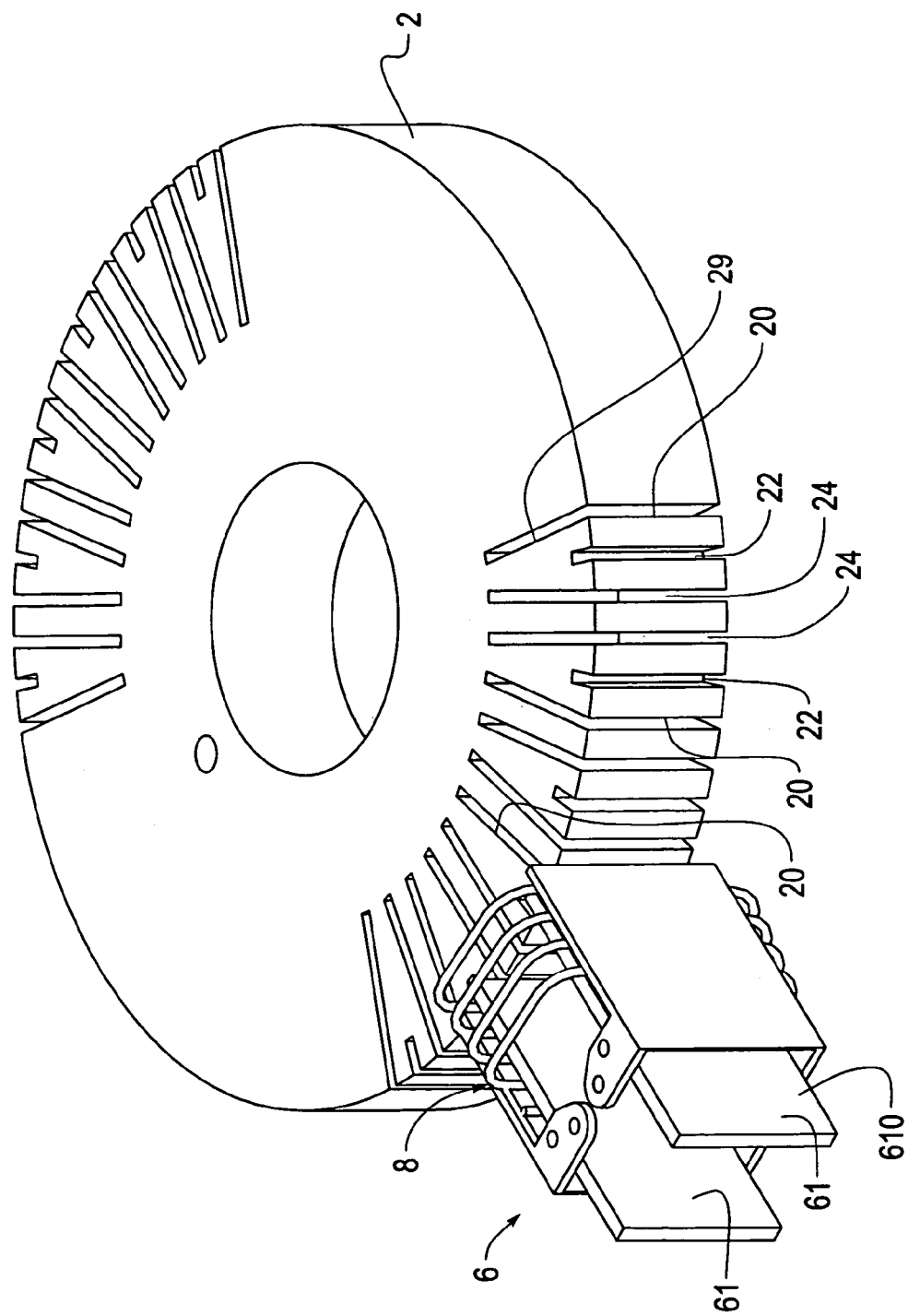
FIG. 8 is an explanatory view showing a state in which the coil is transferred from the transfer device to a magazine, in accordance with the first embodiment.

Further, in the coil insertion step in accordance with the present embodiment, as shown in FIG. 8, a magazine 2 is adopted which has a disc shape which can be disposed in an inner side of the inner peripheral surface of the stator core 1, and which is provided with a coil holding groove 20 on the outer peripheral surface at a position facing the slot 10 of the stator core 1. Further, the coil 8 (the coil inserting portion 801) is inserted and disposed in the coil holding groove 20, and the magazine 2 is disposed in the inner portion of the stator core 1 in such a manner that the coil holding groove 20 of the magazine 2 faces toward the slot 10 of the stator core 1. Next, as shown in FIG. 9, the coil 8 is moved from the coil holding groove 20 to the slot 10 of the stator core 1 by bringing an insertion blade 3, which is a coil insertion mechanism, into contact with the coil 8, and moving the insertion blade 3 forward in a direction from the center of the magazine 2 toward an outer periphery.

Hereinafter, a description will be given in further detail. The motor manufactured in accordance with the invention is a three-phase DC brushless motor. Further, the stator core 1 in accordance with the present embodiment is manufactured by laminating ring-shaped electromagnetic steel plates, and has, in total, seventy two slots 10 on the inner peripheral surface thereof, as shown in FIGS. 9 to 12 and 16.

At this point, a brief description will be given of an example of the disposal of the coil 8 in each of the slots 10 of the stator 1 in accordance with the present embodiment. In the present embodiment, for the stator core 1, a total of thirty six unipolar coils 8 are separated into three groups each comprising twelve unipolar coils corresponding to each phase.

Figure 16:
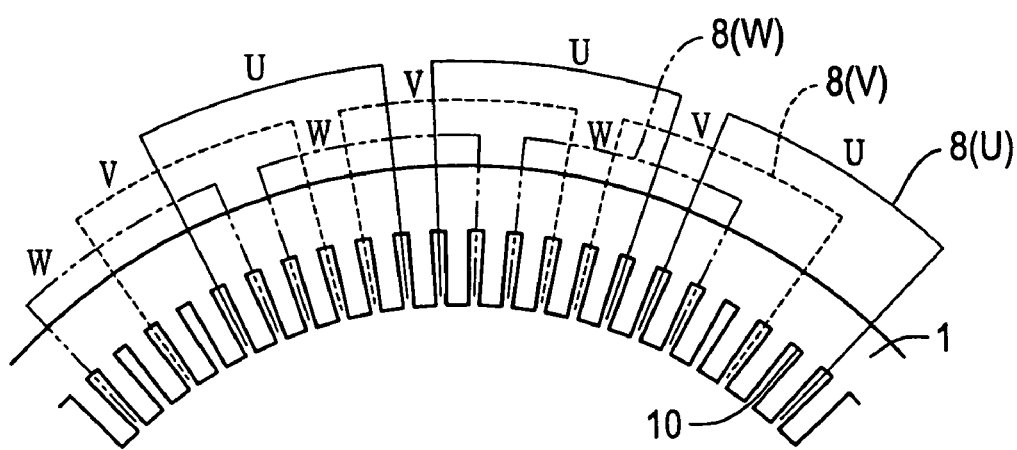
FIG. 16 is an explanatory view showing an arrangement relationship of respective phases of unipolar coils inserted into the motor core, in accordance with the first embodiment.

For the sake of explanation, serial numbers 1 to 72 are attached to the respective slots 10. First, with respect to the first group, one unipolar coil is inserted so as to form a ring passing through the 1st to 6th slot, and, adjacent to this, a unipolar coil is inserted into the adjacent slots so as to form a ring passing through the 7th to 12th slot. Further, adjacent to this, one unipolar coil is disposed for every six slots. Accordingly, as shown in FIG. 16, first, twelve unipolar coils 8 corresponding to the coil group belonging to the W-phase are inserted and disposed in the inner peripheral surface of the stator core 1, so as to be in an adjacent state.

Figure 17:
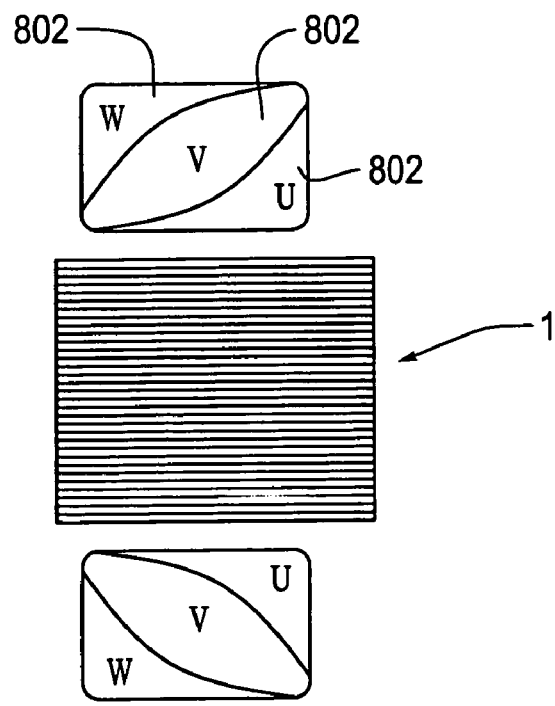
FIG. 17 is an explanatory view showing an overlapping state of coil end portions of the respective phases of the unipolar coils inserted into the motor core, in accordance with the first embodiment.

The unipolar coils 8 belonging to the second and third groups (the V-phase and the W-phase) are disposed so as to be respectively offset two slots and four slots in a circumferential direction from the disposal state of the first group. Accordingly, the total of thirty-six unipolar coils 8 are disposed in the stator core 1 by utilizing all the slots 10. Therefore, as shown in FIG. 16, all of the unipolar coils 8 are attached to the stator core 1 in a state in which portions of the coil end portions 802 of the unipolar coils 8 belonging to the V-phase overlap from the inner peripheral side of the stator core 1 with the coil end portions 802 of the unipolar coils 8 belonging to the W-phase. Further, portions of the coil end portions 802 of the unipolar coils 8 belonging to the W-phase overlap from the inner peripheral side of the stator core 1 with the coil end portions 802 of the unipolar coils 8 belonging to the V-phase. Finally, as shown in FIG. 17, the coil end portions 802 in the respective phases are compactly gathered in a state of being deformed outward from the slot 10, by applying a preliminary formation step and a main forming step described below. Further, in the present embodiment, the unipolar coils 8 corresponding to one group (one phase), that is, twelve unipolar coils 8, are handled at the same time using the magazine 2, and the total of thirty six unipolar coils 8 are attached to the stator core 1 with three operations.

The magazine 2 in accordance with the present embodiment, as shown in FIG. 8, has a pair of right and left coil holding grooves 20, a pair of shallow right and left auxiliary grooves 22 positioned between the coil holding grooves 20, and a pair of right and left preliminary forming grooves 24 positioned between the preliminary forming grooves 24. Further, on the assumption that these six grooves constitute one set, twelve sets are provided adjacently along the entire outer peripheral surface of the magazine 2. Further, all of the adjacent grooves are provided so as to face toward the slot 10 in the stator core 1 (a part thereof is omitted in FIGS. 8 to 12).

Further, all of the auxiliary grooves 22 described above are provided along a radial direction, and all of the grooves are radially directed in different directions. On the other hand, each coil holding groove 20 forms a pair together with the adjacently disposed coil holding groove 20 for insertion of the adjacent unipolar coil 8. These coil holding grooves 20 are provided so as to be parallel to each other. Further, the pair of preliminary forming grooves 24 are also provided so as to be parallel to each other. Before carrying out the operation using the magazine 2 having the structure described above, in the present embodiment, a winding step for forming the coil is carried out. In this winding step, the unipolar coils 8 are formed three at a time.

When carrying out the winding step in accordance with the present embodiment, as shown in FIG. 1, three spools 5 that are disposed in parallel, and a winding arm 59 for winding which supplies a wire (an electric wire) 88 to the spools 5 are utilized. Each of the spools 5 has four hook portions 51, provided on the top and bottom and left and right, as shown in FIG. 1. Notch portions 52 are provided in right and left side surfaces so as to easily insert a transfer device 6 described below. Further, the hook portions 51 are structured so as to be opened and closed laterally, and are opened laterally at a time of winding the wire so as to enter a state of having an increased outer diameter. Further, each of the spools 5 can be fully projected and retracted, and each of the spools 5 is structured such that each spool 5 can turn to the right and left. The winding arm 59 is structured so as to supply the wire 88 while rotating around the spool 5 in a forward moving state. Further, the structure is made such that the rotation direction can be changed.

First, the spool 5 on the left end of the drawing is projected forward as compared to the other spools (not shown), and the wire 88 is supplied while rotating the winding arm 59 in a clockwise direction, around the spool 5 of the left end. Accordingly, the first unipolar coil 8 is formed. Next, the center spool 5 is projected forward at the same time as the left spool 5 is retracted (not shown). Further, the wire 88 is supplied while the winding arm 59 is rotated around the center spool 5 in a counterclockwise direction. Accordingly, the second unipolar coil 8 is formed. Further, as shown in FIG. 1, the right end spool 5 is projected forward at the same time as the center spool 5 is retracted. Further, at this time, the wire 88 is supplied while the winding arm 59 is rotated again around the right end spool 5 in the clockwise direction (a direction of an arrow A). Accordingly, the third unipolar coil 8 is formed.

Next, as shown in FIG. 2, the three spools 5 are aligned in one line by retracting the right end spool 5. Next, as shown in FIG. 3, a shape is arranged that applies a tensile force to three unipolar coils 8 by turning the right and left spools 5 outward a little. It should be noted that, the spool 5 is, as shown in FIGS. 1 to 3, formed into a substantially quadrangular cross sectional shape, and has a tapered outer shape which is inclined with respect to the winding axis center. Accordingly, each of the obtained unipolar coils 8 is formed in a substantially quadrangular shape in which the coil inserting portions 801 and the coil end portions 802 form four periphery lines, as seen from the direction of the winding axis center. Further, a hypothetical surface formed by connecting the substantially linear portions of the adjacent coil end portions 802 has a taper shape inclined with respect to the winding axis center.

Next, in accordance with the present embodiment, as shown in FIGS. 4 to 8, the three unipolar coils 8 formed by the three spools 5 described above are transferred from the spool 5 to the magazine 2 using the transfer device 6. As shown in FIGS. 4 to 7, the transfer device 6 has two base plates 61 and two clamp plates 62, respectively disposed in an outer sides thereof. Each of the base plates 61 and the clamp plates 62 are provided so as to turn or open and close in a horizontal direction, respectively.

Figure 4:
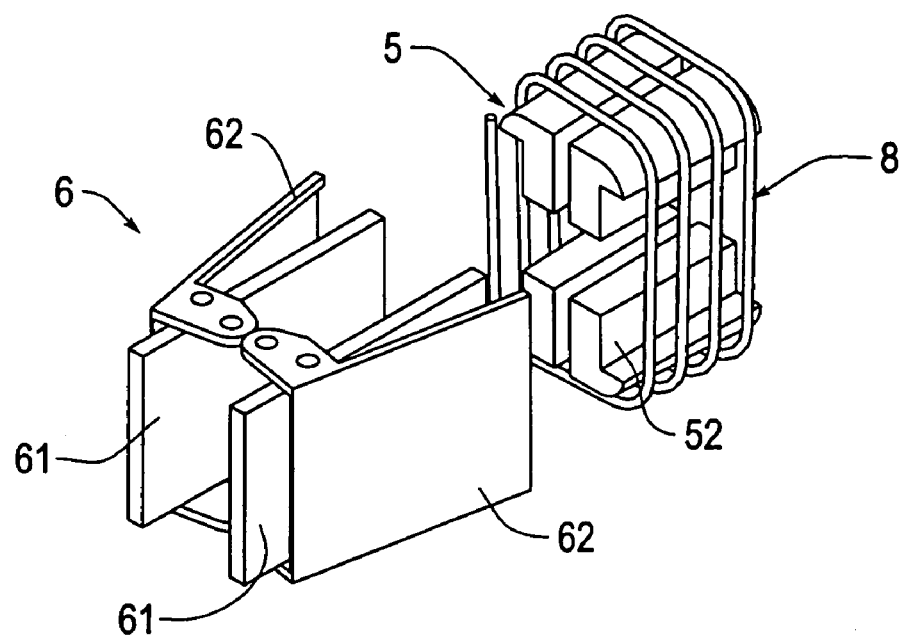
FIG. 4 is an explanatory view showing a state immediately before a transfer device is inserted into the coil on the spool, in accordance with the first embodiment.

At a time of actually carrying out a transfer movement of the coil using the transfer device 6, as shown in FIG. 4, first, the hook portions 51 of the spool 5 are closed in a lateral direction, thereby reducing an outer diameter thereof. Accordingly, a space is formed between the spool 5 and the unipolar coil 8 formed around the periphery thereof. Further, the transfer device 6 positions a space of the base plates 61 in a parallel manner so as to correspond to a position of the space between the spool 5 and the unipolar coil 8. Further, leading end sides of the clamp plates 62 are opened to the right and left so that a space between the clamp plates 62 and the base plates 61 is increased.

Figure 5:
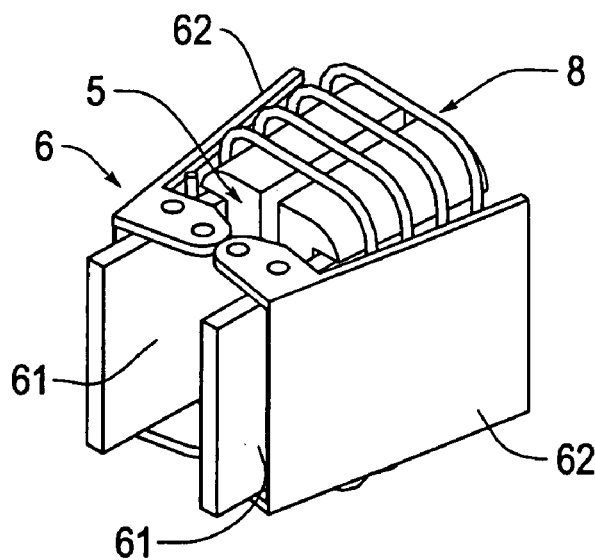
FIG. 5 is an explanatory view showing a state immediately after the transfer device is inserted into the coil on the spool, in accordance with the first embodiment.
Figure 6:
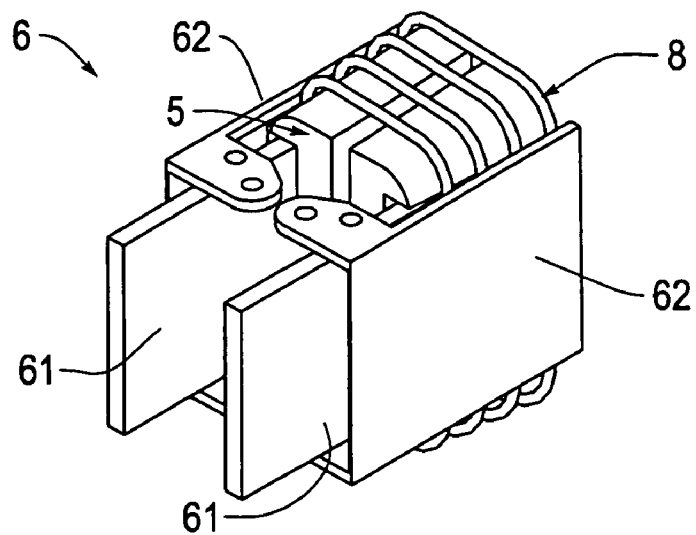
FIG. 6 is an explanatory view showing a state in which the transfer device is inserted into the coil on the spool so as to clamp the coil, in accordance with the first embodiment.
Figure 7:
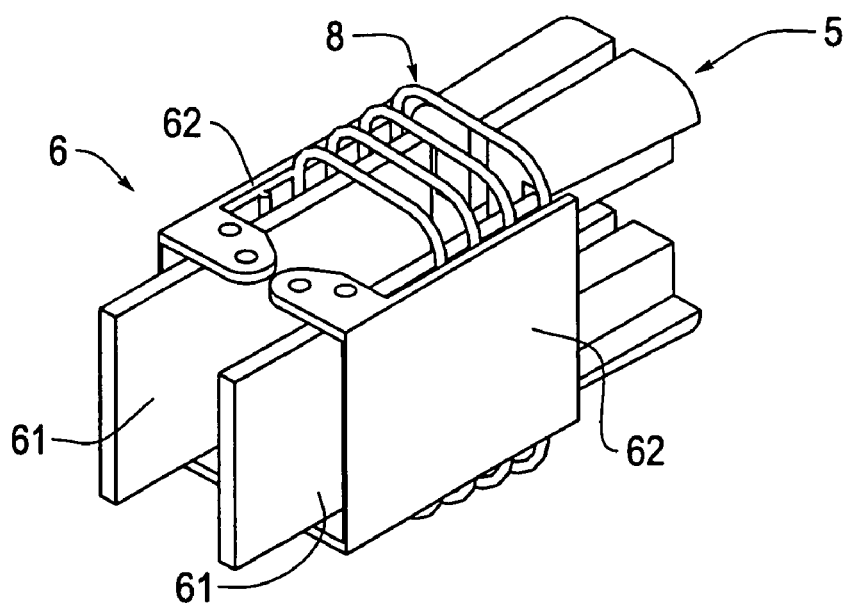
FIG. 7 is an explanatory view showing a state in which the coil on the spool is pulled out by the transfer device, in accordance with the first embodiment.

Next, as shown in FIG. 5, the base plate 61 of the transfer device 6 is inserted into the space between the spool 5 and the unipolar coil 8. Further, as shown in FIG. 6, the unipolar coil 8 is clamped between the clamp plate 62 and the base plate 61 by closing the clamp plate 62. Further, as shown in FIG. 7, removal of the unipolar coil 8 from the spool 5 is completed by moving the transfer device 6 backward.

Next, as shown in FIG. 8, the transfer device 6 faces toward the outer peripheral surface of the magazine 2, and is disposed such that an outer side surface 610 of the base plate 61 is substantially parallel to an inner surface of the coil holding groove 20. Further, the unipolar coil 8 can be moved by opening the clamp plate 62 a little, and the unipolar coil 8 is transferred into the coil holding groove 20 of the magazine 2 by pressing of the unipolar coil 8 using a pusher (not shown). At this time, the unipolar coil 8 is not pressed into the very center of the coil holding groove 20, but is pressed such that a space through which it is possible to insert the insertion blade 3, described below, is provided between the unipolar coil 8 and a bottom portion 29 of the coil holding groove 20.

It is possible to transfer three unipolar coils 8 formed on three spools 5 to the magazine 2 at the same time by carrying out the movements described above at the same time using three transfer devices 6. It should be noted that, each of the unipolar coils 8 may be separated, or alternatively, it is of course possible to transfer the unipolar coils 8 one at a time using one transfer device 6. Further, twelve unipolar coils 8 are disposed around the outer peripheral surface of the magazine 2 by repeating the forming and transferring operations four times for three coils, using the spool 5 described above. It should be noted that the operations from forming the coil to transferring to the magazine 2 can be rationalized in terms of steps, by increasing the equipment of the spool 5, the winding arm 59 and the transfer device 6, and carrying out the operations in parallel.

Next, the coil is moved from the magazine 2 to the stator core 1. First, as shown in FIG. 9, the magazine 2 is disposed in the inner portion of the stator core 1 in such a manner that the coil holding groove 20 of the magazine 2 faces toward the slot 10 of the stator core 1. At this time, all of the unipolar coils 8 on the magazine 2 are disposed so that the coil inserting portions 801 are, respectively, substantially parallel to the inner peripheral opening portions of the corresponding slots 10. Further, during movement of the unipolar coil 8 from the transfer device 6, the unipolar coil 8 is linearly moved such that the transfer device 6 and the magazine 2 face each other. As a result, the protrusion dimensions at both ends protruding from the positions of both end surfaces in the axial direction of the magazine 2 are maintained substantially the same, in the state in which the unipolar coil 8 is held by the magazine 2. The insertion blade 3 is inserted into the space described above in the coil holding groove 20 of the magazine 2. Further, a preliminary formation blade 34 is inserted into the preliminary forming groove 24 of the magazine 2.

Further, as shown in FIGS. 10 and 11, at the same time as the insertion blade 3 is moved forward within the coil holding groove 20 in the direction from the center toward the outer periphery, the preliminary formation blade 34 is moved forward within the preliminary forming groove 24 in the direction from the center toward an outer periphery. Accordingly, the unipolar coil 8 is pressed by the insertion blade 3 and is moved from the coil holding groove 20 to the slot 10 of the stator core 1. The preliminary forming of the upper and lower coil end portions 802 protruding from the stator core 1 in the unipolar coil 8 is executed by pressing the coil end portions 802 such that the coil end portions 802 deform outwards, using the preliminary formation blade 34.

The forward movement of the insertion blade 3 and the preliminary formation blade 34 described above is simultaneously carried out for all of the twelve unipolar coils 8, and thus the twelve unipolar coils 8 in one group are simultaneously inserted into the slot 10 of the stator core 1. In addition, in this coil insertion step, a positional relation of the unipolar coil 8 in the axial direction of the magazine 2 is maintained by disposing the coil inserting portion 801 of the unipolar coil 8 in the coil holding groove 20 of the magazine 2, based on a friction force between the coil inserting portion 801 and the coil holding groove 20. Further, it is possible to maintain a position of the unipolar coil 8 during the transfer by utilizing the friction force, and it is possible to maintain the protrusion dimensions from the stator core 1 at both ends of the unipolar coil 8 substantially the same.

Figure 12:
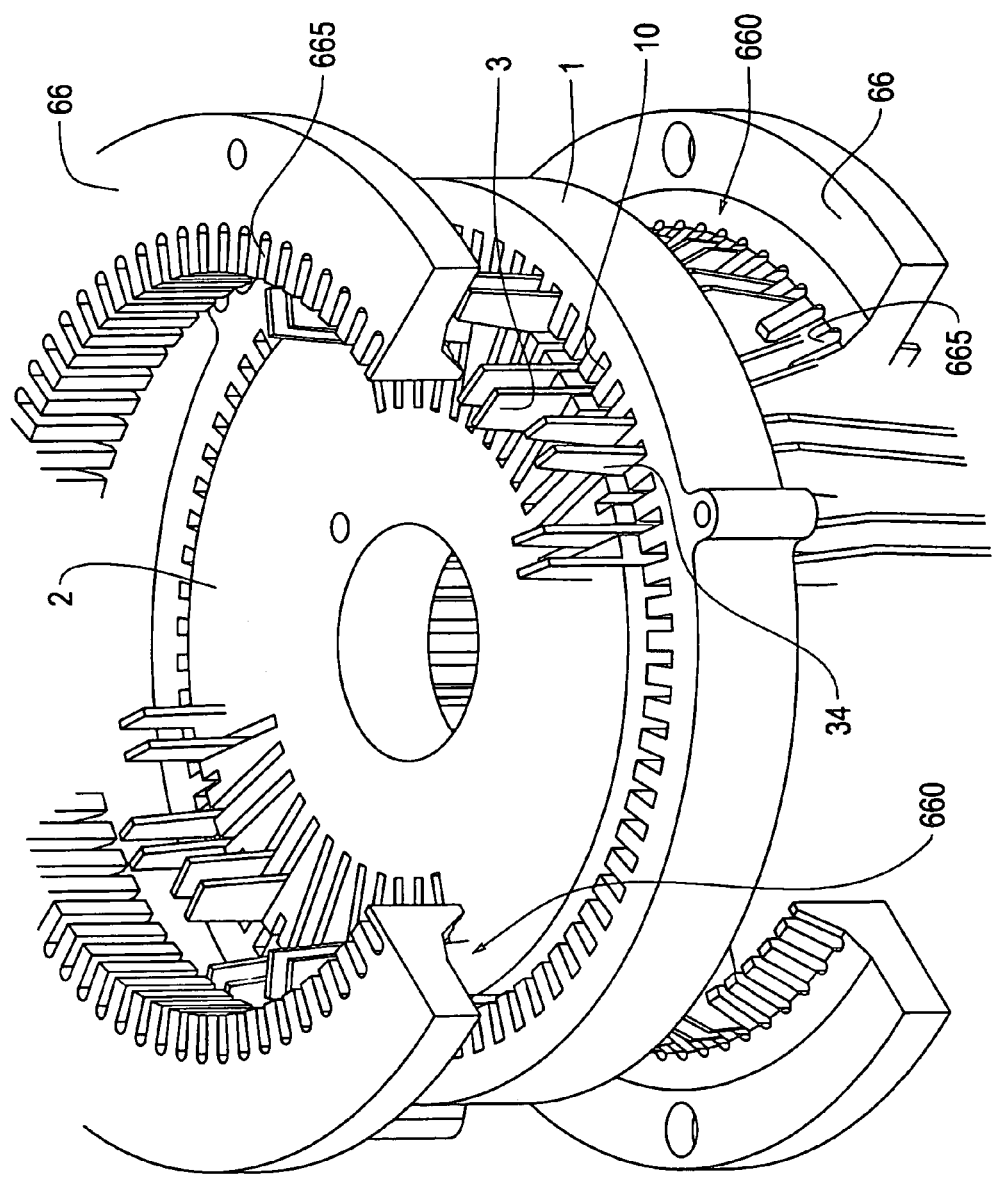
FIG. 12 is an explanatory view showing a state in which upper and lower formers are moved forward toward the motor core, in accordance with the first embodiment.

Next, in accordance with the present embodiment, a second preliminary formation step is carried out using a pair of upper and lower formers 66 which are also used in the main forming step. Each former 66 has a ring shape as shown in FIG. 12, and has a forming surface 660 for arranging the side of the coil facing toward the stator core 1 in a desired shape. In particular, each of the upper and lower formers 66 has a taper-shaped forming surface 660 structured such that an inner peripheral surface protrudes toward the stator core 1. Further, the structure is made so as to form the coil 8 outwardly along the taper shape of the forming surface 660 by moving the former 66 forward toward the stator core 1. Further, each of the formers 66 is provided with a notch portion 665 for preventing interference with the insertion blade 3 and the preliminary formation blade 34. Further, it is possible to press the former 66 to the stator core 1 while maintaining a state in which the insertion blade 3 and the preliminary formation blade 34 are moved forward.

The pair of upper and lower formers 66 having the structure described above are respectively moved forward from the upper and lower sides toward the stator core 1, and are pressed to the stator core 1. Accordingly, the second preliminary forming is carried out such that the coil end portions, belonging to the twelve unipolar coils 8 disposed in the stator core 1, protruding from the upper and lower sides of the stator core 1 as described above, are tilted toward the stator core 1. In this case, in the preliminary formation step, the coil end portions 802 arranged in the tapered manner of the unipolar coil 8 are inserted into the stator core 1 and are deformed by being pressed by the preliminary formation blade 34. Accordingly, among the coil end portions 802, the coil end portion 802 positioned in the inner peripheral side of the stator core 1 and having the largest size in the height direction moves to an outermost peripheral side, and the coil end portion 802 having the smallest size in the height direction deforms so as to be positioned in an innermost peripheral side. Further, all of the coil end portions 802 are deformed toward the outer peripheral side, and a space for disposing the coil end portions 802 of the next phase unipolar coil 8 is formed. Then, the operation and effect described above is assisted by the second preliminary forming.

Next, according to the present embodiment, the twelve unipolar coils 8 in the second group are inserted and disposed on the magazine 2, by forming the coil using the spool 5 and the winding arm 59, described above, and carrying out the coil transfer operation using the transfer device 6. Then, in the same manner as described above, the magazine 2 is disposed in the inner portion of the stator core 1 so that the coil holding groove 20 of the magazine 2 faces toward the slot 10 of the stator core 1. At this time, the magazine 2 and the stator core 1 are disposed such that their relative positions are shifted. Accordingly, the relative position of the first phase coils which are the first group and the coils in the second group are shifted. Next, the transfer of the coil 8 is carried out using the insertion blade 3, and the preliminary forming is carried out using the preliminary formation blade 34. Further, the second preliminary forming is carried out using the pair of upper and lower formers 66 in the same manner as described above.

Next, with respect to twelve unipolar coils 8 in the third group, the operation is carried out in the same manner as for the first and second groups. However, when moving the coils from the magazine 2 to the stator core 1, the relative positions of the magazine 2 and the stator core 1 are shifted so that the third group (the third phase) is shifted with respect to the first group (the first phase) and the second group (the second phase). The second preliminary forming with respect to the third group effectively becomes the main forming step. That is, at the stage when the coils in the third group are inserted into the stator coil 1, all of thirty six unipolar coils 8 are in a state of being attached to the stator core 1. Further, the preliminary forming by the preliminary formation blade 34 is directly applied to only the twelve unipolar coils 8 in the third group. On the other hand, the forming by the former 66 which is carried out as the second preliminary forming is applied to all of the thirty six unipolar coils 8, and becomes a main forming step of arranging the shape of the entire coil. In the manner described above, thirty six unipolar coils 8 are fully disposed by insertion into the stator core 1, and a state in which the main forming is completed is established.

Figure 13:
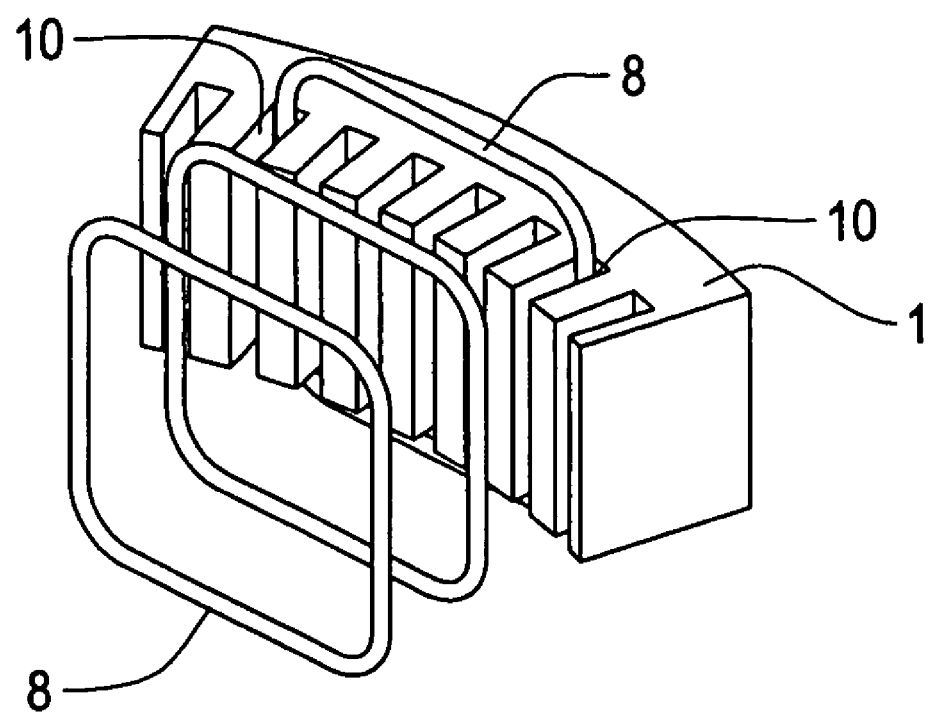
FIG. 13 is an explanatory view showing a state in which a trajectory of the coil at a time of inserting the coil into the motor core is seen from an oblique direction, in accordance with the first embodiment.
Figure 14:
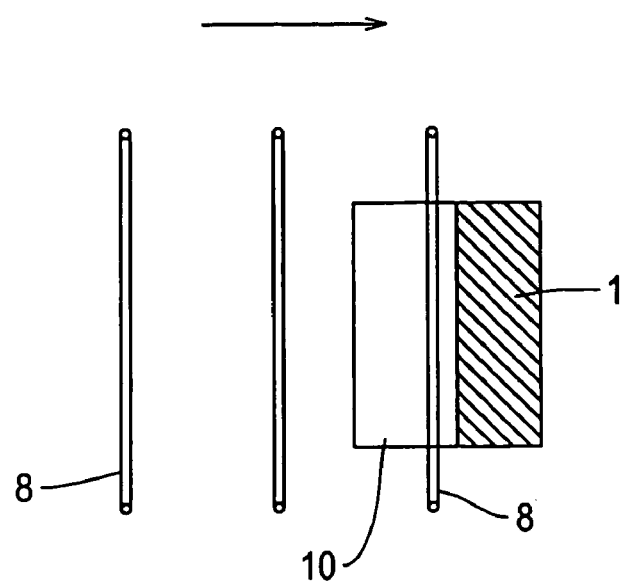
FIG. 14 is an explanatory view showing a state in which the trajectory of the coil at the time of inserting the coil into the motor core is seen from a horizontal direction, in accordance with the first embodiment.
Figure 15:
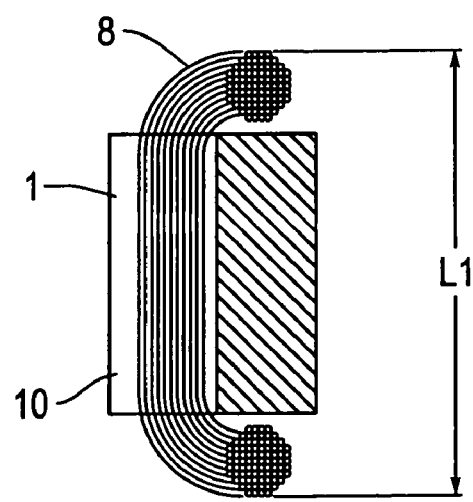
FIG. 15 is an explanatory view showing a size of the coil inserted into the motor core, in accordance with the first embodiment.

In this case, in the present embodiment, the operations from the forming of twelve unipolar coils in each of the groups to the second preliminary forming are carried out as a series of operations. However, it is of course possible to carry out the operations from coil forming to the insertion and disposal of the coils in the magazine 2 in a parallel manner for three sets of coils, using three sets of magazines 2, thereby facilitating rationalization of the operations. As described above, in accordance with the present embodiment, it is possible to easily and stably carry out a so-called linear insertion method, by utilizing the magazine 2 and the insertion blade 3. In other words, as shown in FIGS. 13 and 14, it is possible to linearly insert the coil 8 into the slot 10 while holding the coil 8 such that the protrusion dimensions at both ends described above are maintained substantially the same, without changing the position of the coil 8. Accordingly, it is not necessary to increase the length of the coil 8 in the vertical direction more than necessary. In particular, as shown in FIG. 15, a size L1 in the vertical direction of the coil 8 inserted into the stator core 1 can be made sufficiently shorter.

The shape of the coil of the unipolar coil 8 in accordance with the present embodiment, in contrast to the conventional unipolar coil which has a shape that hardly changes along the direction of the winding axis, changes in the taper shape along the direction of the winding axis. Thus, the unipolar coil 8 has an optimal shape with respect to overlap of the portions of the coil end portions 801 in the different phases of the unipolar coils 8. Accordingly, it is possible to prevent excess coils 8 from protruding from the stator core 1, and it is possible to reduce the length in the axial direction of the part in which the coil 8 is attached to the stator core 1 and by extension it is possible to reduce the length in the axial direction of the motor.

In particular, in the present embodiment, the preliminary forming groove 24 is provided in the magazine 2, and the preliminary forming is carried out by moving the preliminary formation blade 34. Accordingly, it is possible to easily carry out the preliminary forming of pressing and outwardly deforming the coil end portion which is the protruding portion of the coil, every time each of the unipolar coils 8 is attached to the stator core 1. Further, this operation can be carried out at the same time as the coil is transferred, and thus it is possible to promote simplification of the apparatus and the process.

In accordance with the present embodiment, the second preliminary forming and the main forming of the coil 2 are carried out by pressing the stator core 1 using the former 66 described above. Accordingly, it is possible to form the preliminarily formed coil in the desired shape at the same time, simply by pressing the former 66 to the stator core 1. Further, since it is possible to form the coil end portion protruding from the stator core 1 such that the coil end portion comes into proximity with the stator core 1, due to the second preliminary forming and the main forming, it is possible to make the size in the axial direction small.

The notch portion is provided in the former 66, and thus it is possible to press the former 66 to the stator core 1 while maintaining the state in which the insertion blade 3 and the preliminary formation blade 34 are moved forward. Accordingly, as described above, it is possible to successively carry out the second preliminary forming and the main forming using the former 66, subsequent to the steps of inserting the coil 8 to the stator core 1 and preliminary forming, and it is possible to rationalize the manufacturing process.

In this case, in the present embodiment, the insertion blade 3 is employed as the coil insertion mechanism and the preliminary formation blade 34 is employed as the preliminary formation mechanism. However, in place thereof, it is possible to employ divided insertion blades or divided insertion hooks, and divided preliminary formation blades or divided preliminary forming hooks having a structure divided into a front side surface and a back side surface of the magazine 2. Further, in this case, it is possible to respectively integrate the divided insertion blades or the divided insertion hooks, and the divided preliminary formation blades or the divided preliminary forming hooks on the front side surface and the back side surface of the magazine 2, and thus it is possible to promote simplification of the apparatus. Further, in this embodiment the three-phase DC brushless motor is used as an example, however, the method described above can be applied to the other motors having other structures.

A second embodiment of the invention will now be described. In the present embodiment, as shown in FIGS. 18 and 19, a description will be given in more detail of an embodiment of a coil insertion apparatus, for inserting the coil into the stator 1 from the magazine 2 of the first embodiment.

Figure 18:
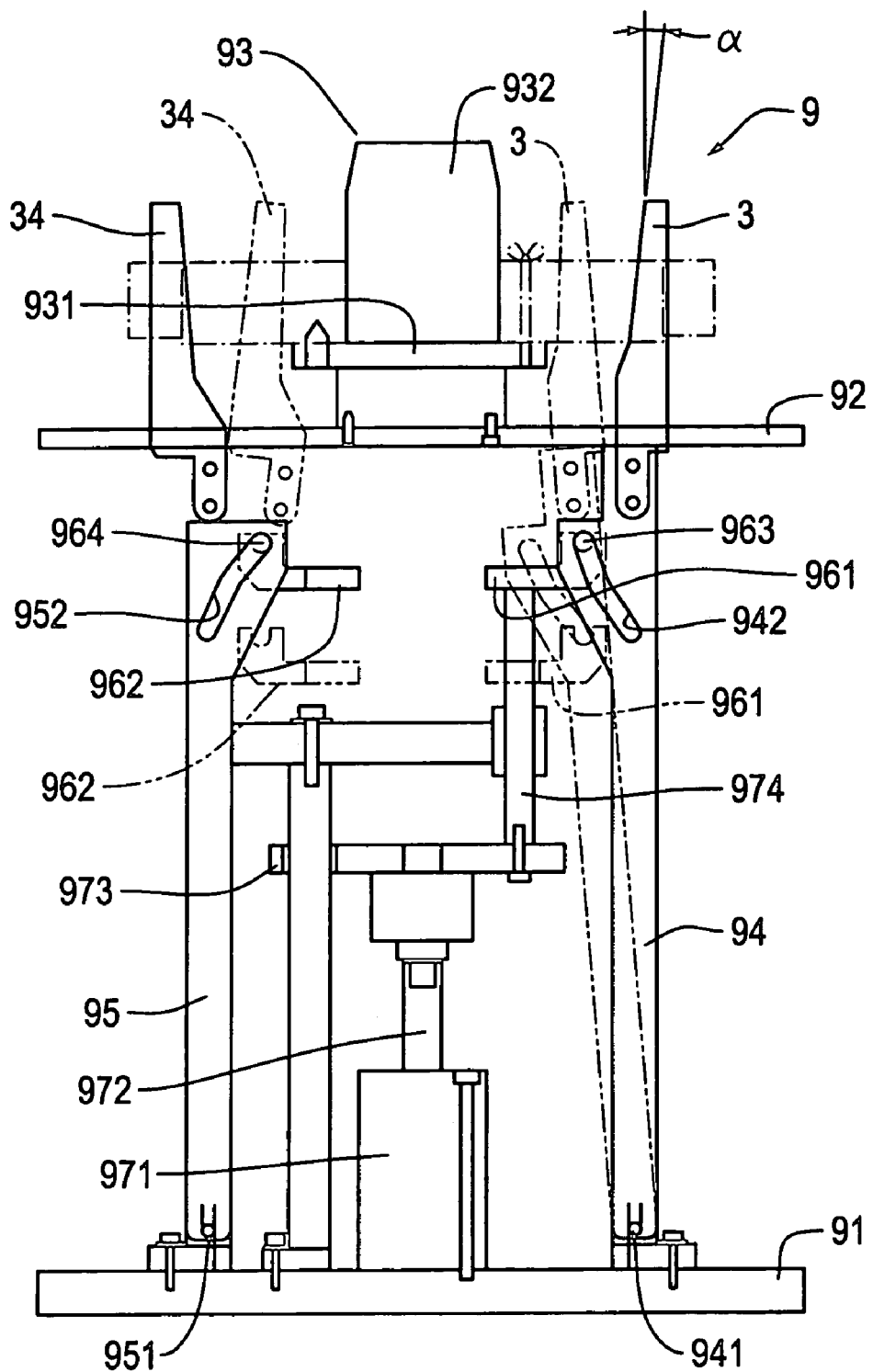
FIG. 18 is an explanatory view showing a structure of a coil insertion apparatus, in accordance with a second embodiment.
Figure 19:
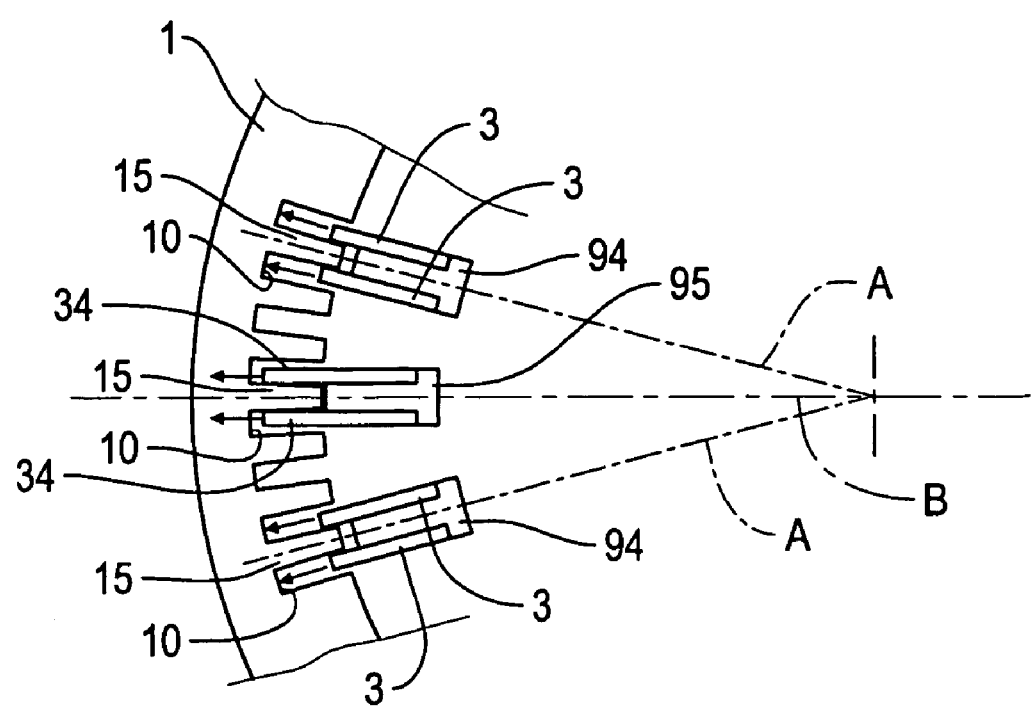
FIG. 19 is an explanatory view showing a movement of an insertion blade, or the like, of the coil insertion apparatus, in accordance with the second embodiment.
Figure 20:
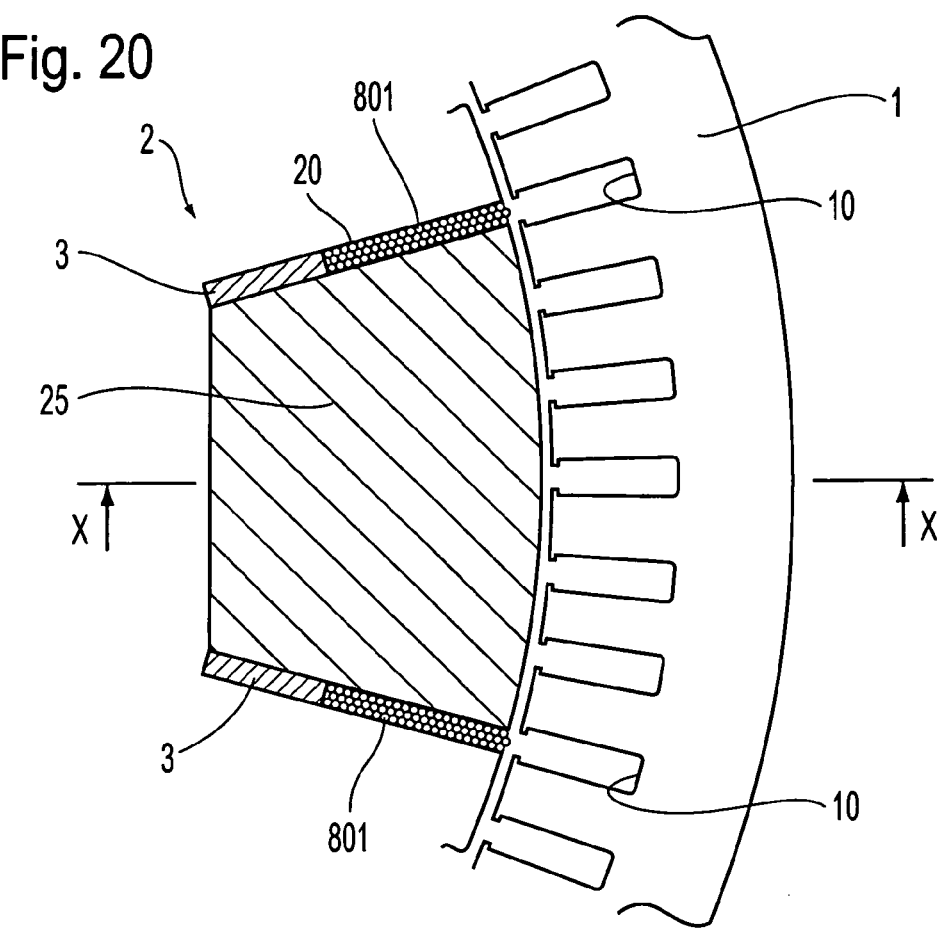
FIG. 20 is an explanatory view showing a state in which a positioning apparatus provided in a magazine is seen from an axial direction of the magazine, in accordance with a third embodiment.

A coil insertion apparatus 9 in accordance with the present embodiment has, as shown in FIG. 18, a top plate portion 92 fixed via a support column (not shown) extending from a bottom plate portion 91, and is provided with a magazine cradle 93 for mounting the magazine 2 in a top portion thereof. The magazine cradle 93 is constituted by a flange portion 931 and a central projection portion 932 having a circular cylindrical shape with a smaller diameter than the flange portion 931.

Further, the bottom plate portion 91 is provided with a plurality of first arms 94 disposed so as to be swingable around a support point 941, and a plurality of second arms 95 disposed so as to swingable around a support point 951. The first arms 94 have the insertion blade 3 at a top end thereof as shown in the same drawing, and on the other hand, the second arm 95 has the preliminary formation blade 34 at a top end thereof. The first arm 94 has an elongated hole portion 942 capable of engaging with a pin 963 provided in a hoisting plate 961. Further, the second arm 95 has an elongated hole portion 952 capable of engaging with a pin 964 provided in a second hoisting plate 962, as shown in the same drawing.

The hoisting plate 961 is connected to a cylinder 971, a hoisting rod 972, a base plate 973, a connection rod 974, and the like, which are disposed on the bottom plate portion 91, and is structured so as to move up and down in correspondence to vertical movement of the hoisting rod 972 driven by the cylinder 971. The elongated hole portions 942 and 952 provided in the first arm 94 and the second arm 95 have inclined elongated hole portions. In addition, a position of engagement between the pins 963 and 964 and the elongated hole portions 942 and 952 is shifted on the basis of a movement in a vertical direction of the pins 963 and 964. Accordingly, the first arm 94 and the second arm 95 are structured so as to swing around the support points 941 and 951. In this case, the elongated hole portion 942 of the first arm 94 and the elongated hole portion 952 of the second arm 95 change shape, slightly, and thus impart a different amount of swing to the first arm 94 and the second arm 95.

As shown in FIG. 19, two insertion blades 3 are disposed in each of the first arms 94 in parallel, and the structure is such that two insertion blades 3 move together in parallel toward the swinging direction of the first arm 94. It should be noted that, all of the swinging directions of the first arms 94 are directions along a radial direction A passing through a center of each of the teeth 15 positioned between any two of the slots 10 of the stator 1. In the same manner, the two preliminary formation blades 34 are disposed in parallel in each of the second arms 95, and the structure is such that the two preliminary formation blades 34 move together in parallel toward the swinging direction of the second arm 95. Further, all of the swinging directions of the second arms 95 are directions along a radial direction B passing through the center of each of the teeth 15 positioned between any two of the slots 10 of the stator 1.

A significant point of this coil insertion apparatus 9 is that, as shown in FIG. 18, an angle of inclination α of the insertion blade 3 at a swing startup position with respect to the vertical direction is set within 5 degrees, and an angle of inclination at a swing end position with respect to the vertical direction is set to 0 degrees. Accordingly, at a time of moving the coil to the stator 1 from the magazine 2 using the coil insertion apparatus 9, it is possible to substantially linearly move all of the unipolar coils 8 simultaneously toward the stator core 1 in a state in which an angle formed between a coil inserting portion 801 brought into contact with the insertion blade 3 and the slot 10 of the stator 1 is constantly maintained within 5 degrees. Further, accordingly, the position of unipolar coil 8 in the vertical direction is barely shifted, and it is possible to move the unipolar coil 8 while maintaining the protrusion dimensions at both ends protruding from the positions at both end surfaces of the stator core 1 in the axial direction substantially the same. The other effects of the embodiment are the same as those described for the first embodiment.

A third embodiment of the invention will now be described. The present embodiment is an embodiment in which a positioning apparatus 25 is provided in the magazine 2 of the first embodiment. That is, as shown in FIGS. 20 to 23, the positioning apparatus 25 is provided in an axial direction on both surfaces of the magazine 2 and has an overall shape that is substantially fan shaped, and a taper shape with a cross sectional shape that becomes gradually smaller in height from an inner peripheral side toward an outer peripheral side. This positioning apparatus 25 is disposed in a fixed state with no forward or backward movement, and fulfills the function of maintaining the shape of the unipolar coil 8 when transferring the unipolar coil 8 from the transfer device 6.

Figure 21:
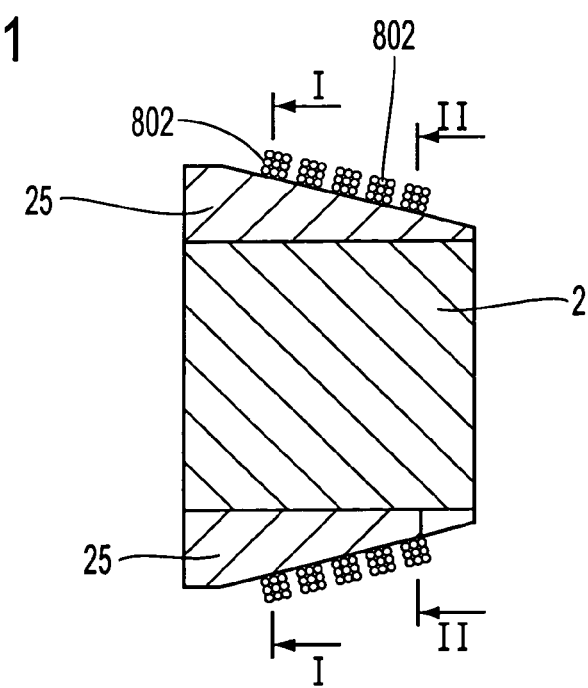
FIG. 21 is an explanatory view showing a state in which the positioning apparatus provided in the magazine is seen cross-sectionally in the diametrical direction of the magazine, in accordance with the third embodiment.
Figure 22:
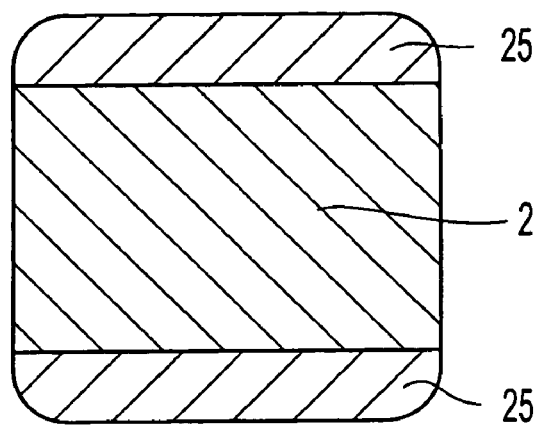
FIG. 22 is a cross sectional view along a line I—I in FIG. 21, in accordance with the third embodiment.
Figure 23:
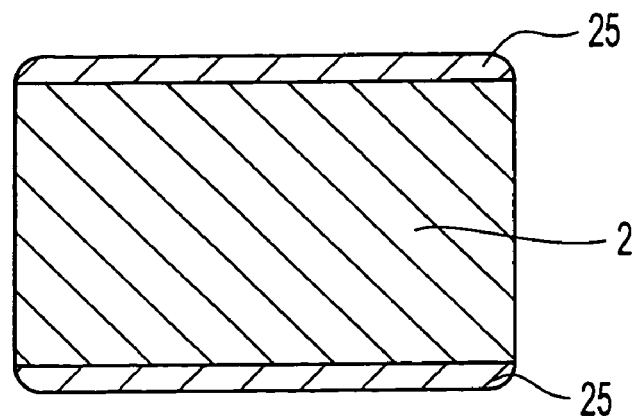
FIG. 23 is a cross sectional view along a line II—II in FIG. 21, in accordance with the third embodiment.
Figure 24:
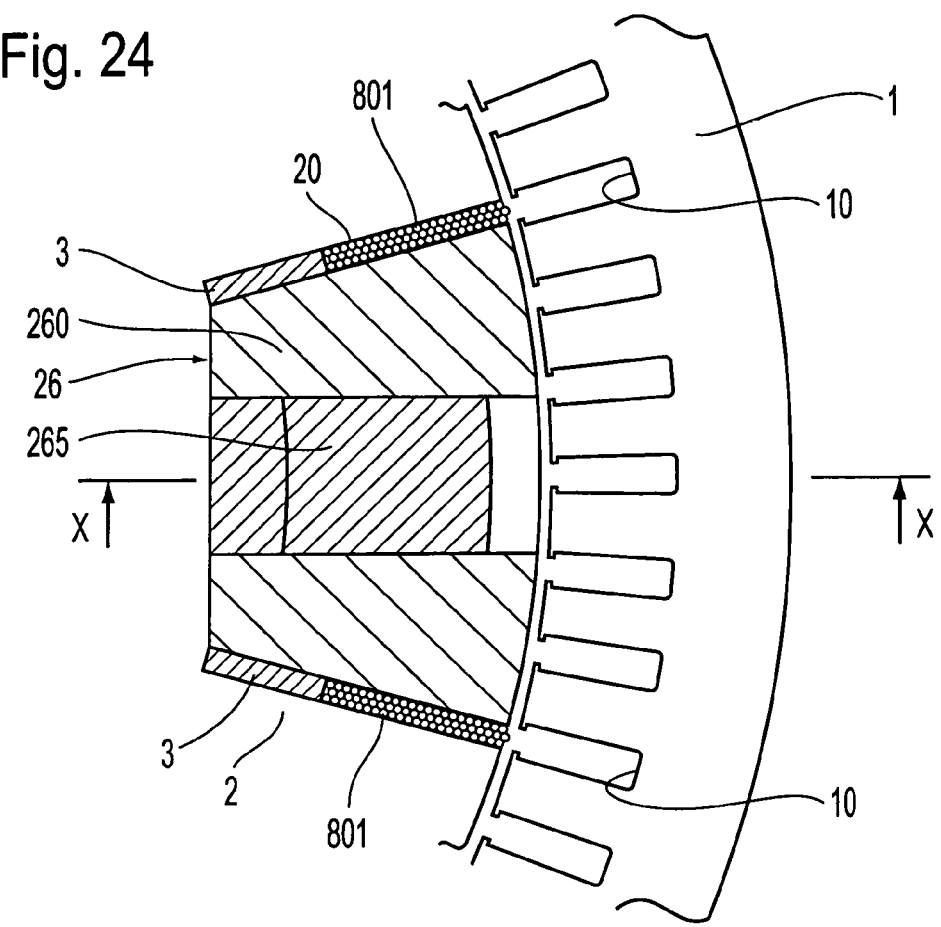
FIG. 24 is an explanatory view showing a state in which a positioning apparatus provided in a magazine is seen from an axial direction of the magazine, in accordance with a fourth embodiment.

Further, as shown in FIGS. 21 to 23, a peripheral length has a relationship Lr>Lf when in a state in which the unipolar coil 8 is maintained, when setting a cross sectional portion along I—I in FIG. 21 to Lr, and setting a cross sectional portion along II—II in FIG. 21 to Lf. This is caused by an effect of the taper shape described above.

In the coil insertion step described above, as also shown in FIG. 20, the insertion blade 3 is brought into contact with the coil inserting portion 801 of the unipolar coil 8 so as to be moved from the inner peripheral side to the outer peripheral side. Accordingly, it is possible to start moving the unipolar coil 8 from the state of maintaining the coil shape of the unipolar coil 8 by the positioning apparatus 25. In this case, it is possible to make the position of the unipolar coil 8 when starting the movement an optimum state, and it is possible to maintain a state of the dimensions in a more precise fashion. As well as these effects, the same operations and effect can be obtained as with the first embodiment.

A fourth embodiment of the invention will now be described. The present embodiment is an embodiment in which a positioning apparatus 26 capable of moving forward and backward is provided in the magazine 2 of the first embodiment.

That is, as shown in FIGS. 24 to 27, a positioning apparatus 26 is provided in an axial direction on both surfaces of the magazine 2, and has an overall shape that is substantially fan shaped, and a taper shape with a cross sectional shape that becomes gradually smaller in height from an inner peripheral side toward an outer peripheral side. This positioning apparatus 26 has a main body portion 260 which is disposed in a fixed state with no forward or backward movement, and a center block 265 which is disposed in a center portion thereof so as to freely move forward and backward. The center block 265 is structured so as to move from an inner peripheral side toward an outer peripheral side in correspondence to the forward movement of the insertion blade 3.

Figure 25:
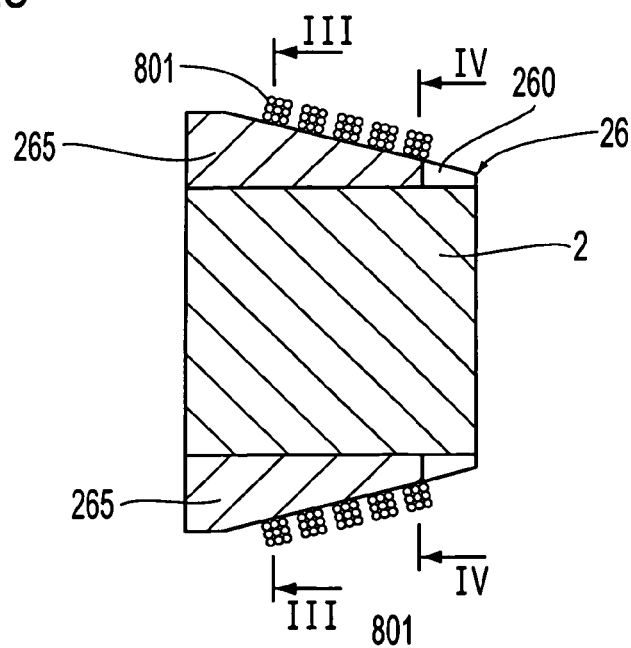
FIG. 25 is an explanatory view showing a state in which the positioning apparatus provided in the magazine is seen cross-sectionally in the diametrical direction of the magazine, in accordance with the fourth embodiment.
Figure 26:
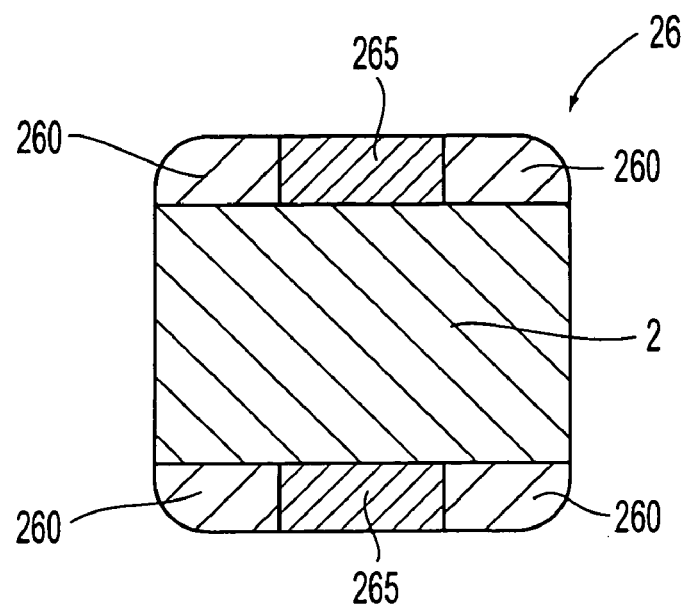
FIG. 26 is a cross sectional view along a line III—III in FIG. 25, in accordance with the fourth embodiment.
Figure 27:
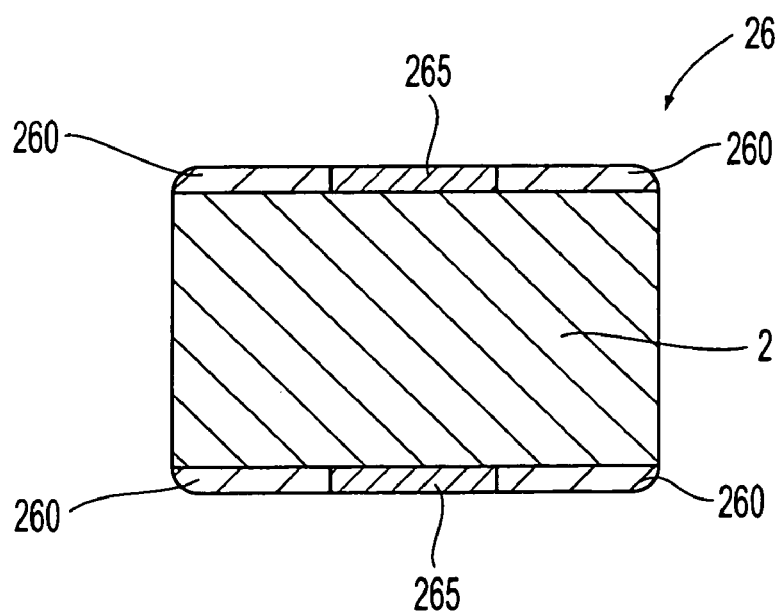
FIG. 27 is a cross sectional view along a line IV—IV in FIG. 25, in accordance with the fourth embodiment.
Figure 28:
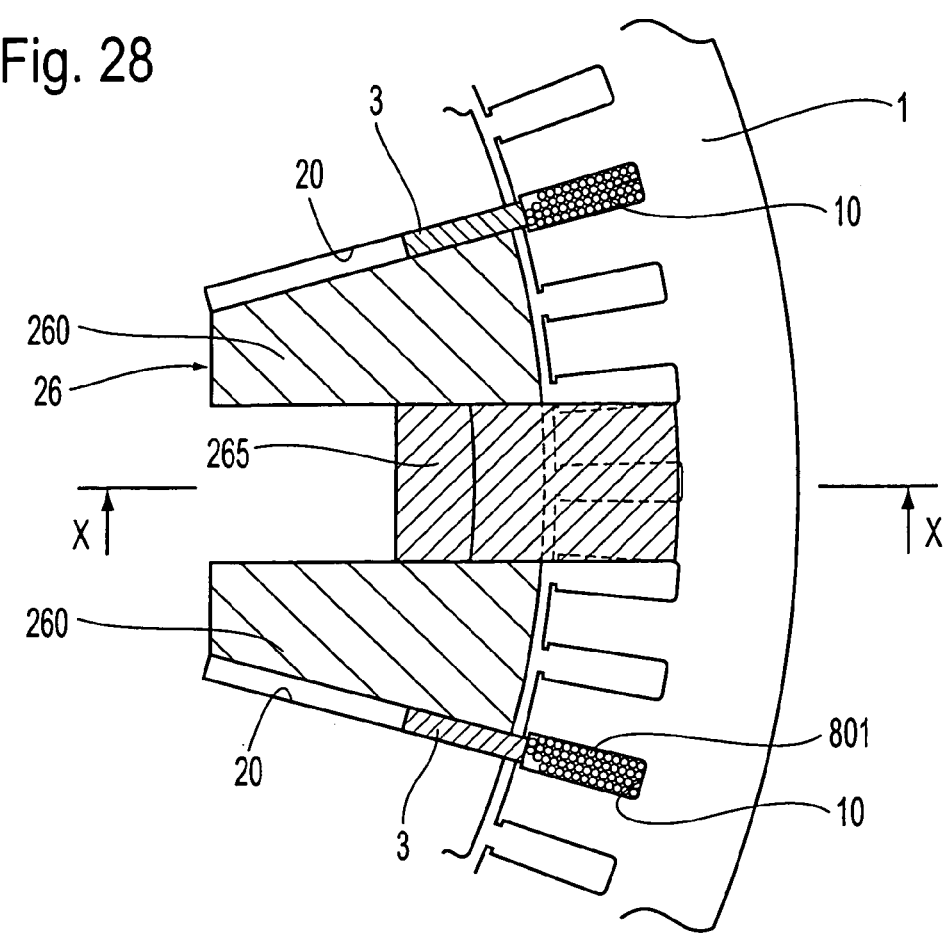
FIG. 28 is an explanatory view showing a state in which a moving portion of the positioning portion is moved forward, as seen from the axial direction of the magazine, in accordance with the fourth embodiment.
Figure 29:
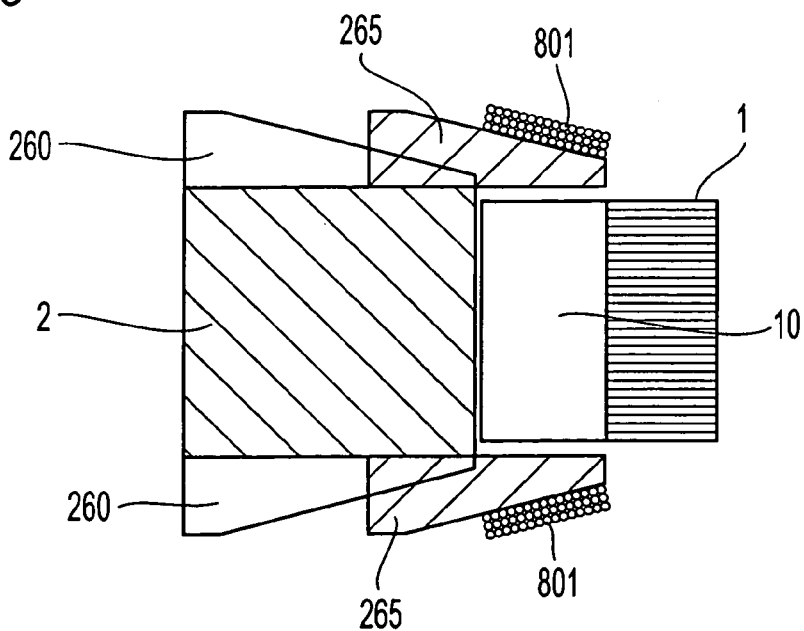
FIG. 29 is an explanatory view showing a state in which the moving portion of a positioning portion is moved forward, as seen cross-sectionally in a diametrical direction of the magazine, in accordance with the fourth embodiment.

As shown in FIGS. 26 and 27, a peripheral length has a relationship Lr>Lf when in a state in which the unipolar coil 8 is maintained, when setting a cross sectional portion along III—III in FIG. 25 to Lr, and setting a cross sectional portion along IV—IV to Lf, in the same manner as the third embodiment. This is also caused by an effect of the taper shape described above. In the coil insertion step described above, as also shown in FIGS. 28 and 29, the movement of the unipolar coil 8 is started from the state of maintaining the unipolar coil 8 with a coil shape that is a taper shape, using the entire positioning apparatus 26. That is, at the same time as when the insertion blade 3 is brought into contact with the coil inserting portion 801 of the unipolar coil 8 so as to move the unipolar coil 8 from the inner peripheral side to the outer peripheral side, the center block 265 is moved from the inner peripheral side to the outer peripheral side.

Accordingly, it is possible to position of the unipolar coil 8 when starting the movement into an optimum state, and a dimension relationship of the unipolar coil 8 in the height direction can constantly be maintained by the center block 265 during the movement of the unipolar coil 8. Accordingly, it is possible to move the unipolar coil 8 to the stator core 1 in a more accurate dimension state. As well as these effects, the same operations and effect can be obtained as with the first embodiment. Further, in the present embodiment, the center block 265 is moved in the coil insertion step. However, in place of this, it is possible to carry out an axial positioning step in which disposal is executed such that the protrusion dimensions at both ends protruding from both end surfaces in the axial direction of the stator core 1 of the unipolar coil 8 become substantially the same, by inserting the center block 265 of the positioning apparatus 26 between both end surfaces in the axial direction of the stator core 1 and the coil end portion 802, by moving the center block 265, after finishing the coil insertion step.

A fifth embodiment of the invention will now be described. The present embodiment, as shown in FIGS. 30 to 48, is an embodiment in which the coil formation step is carried out using a magazine (a winding jig) 7 having a special structure. This magazine 7 also functions as a winding jig used in the coil formation step, as was the case for the magazine described above.

Figure 30:
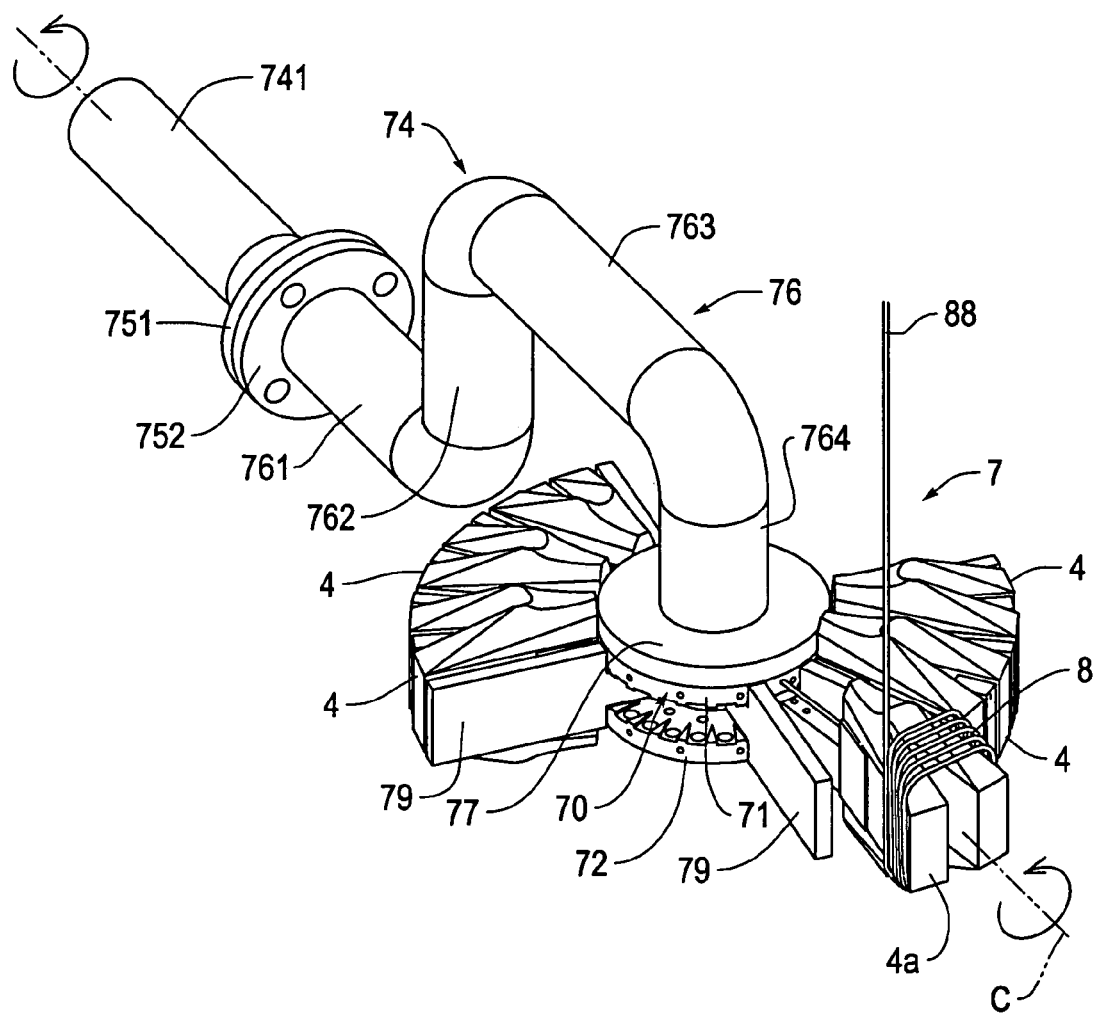
FIG. 30 is an explanatory view showing a structure of a coil formation apparatus, in accordance with a fifth embodiment.
Figure 31:
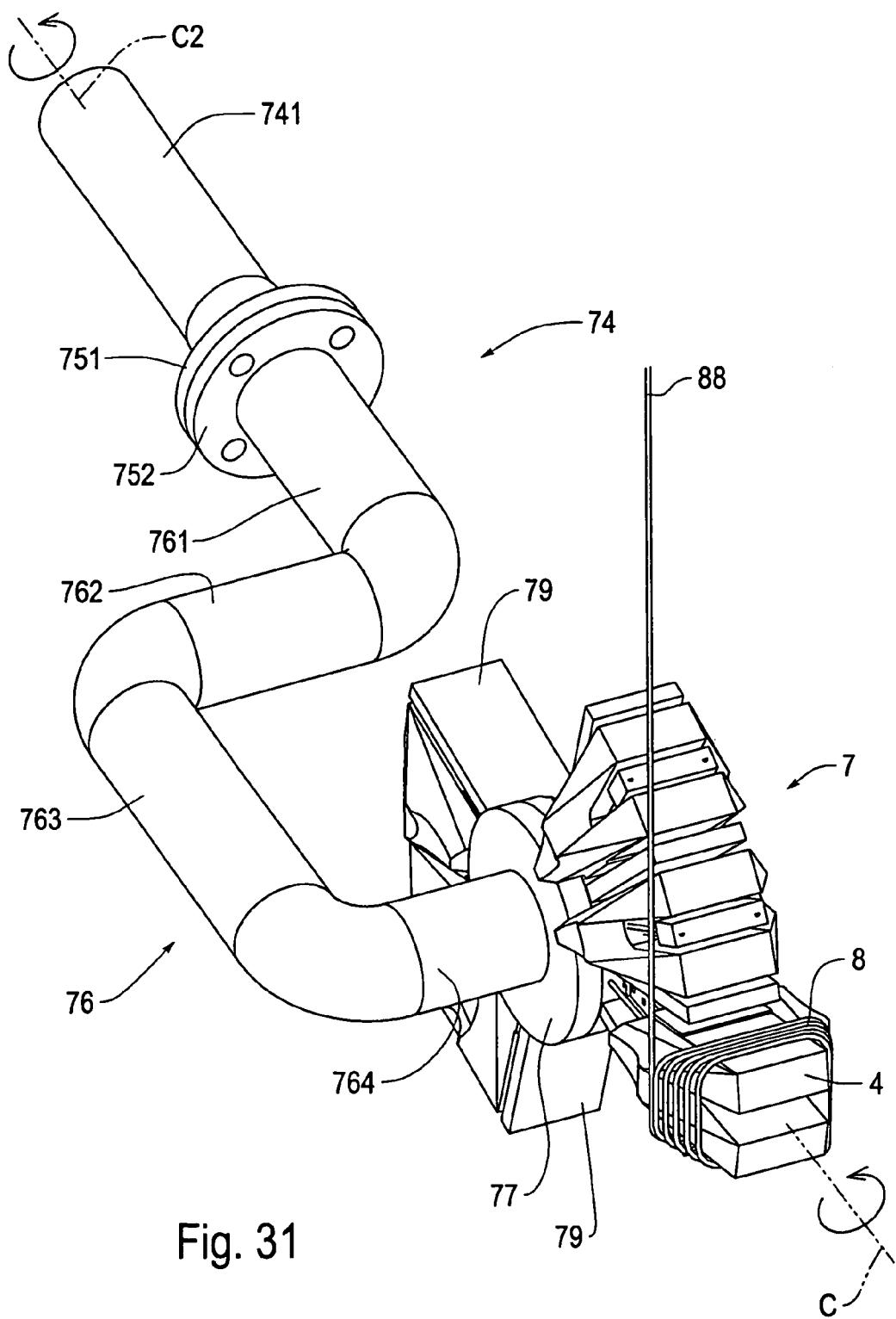
FIG. 31 is an explanatory view showing a state in which a coil is formed by the coil formation apparatus, in accordance with the fifth embodiment.
Figure 32:
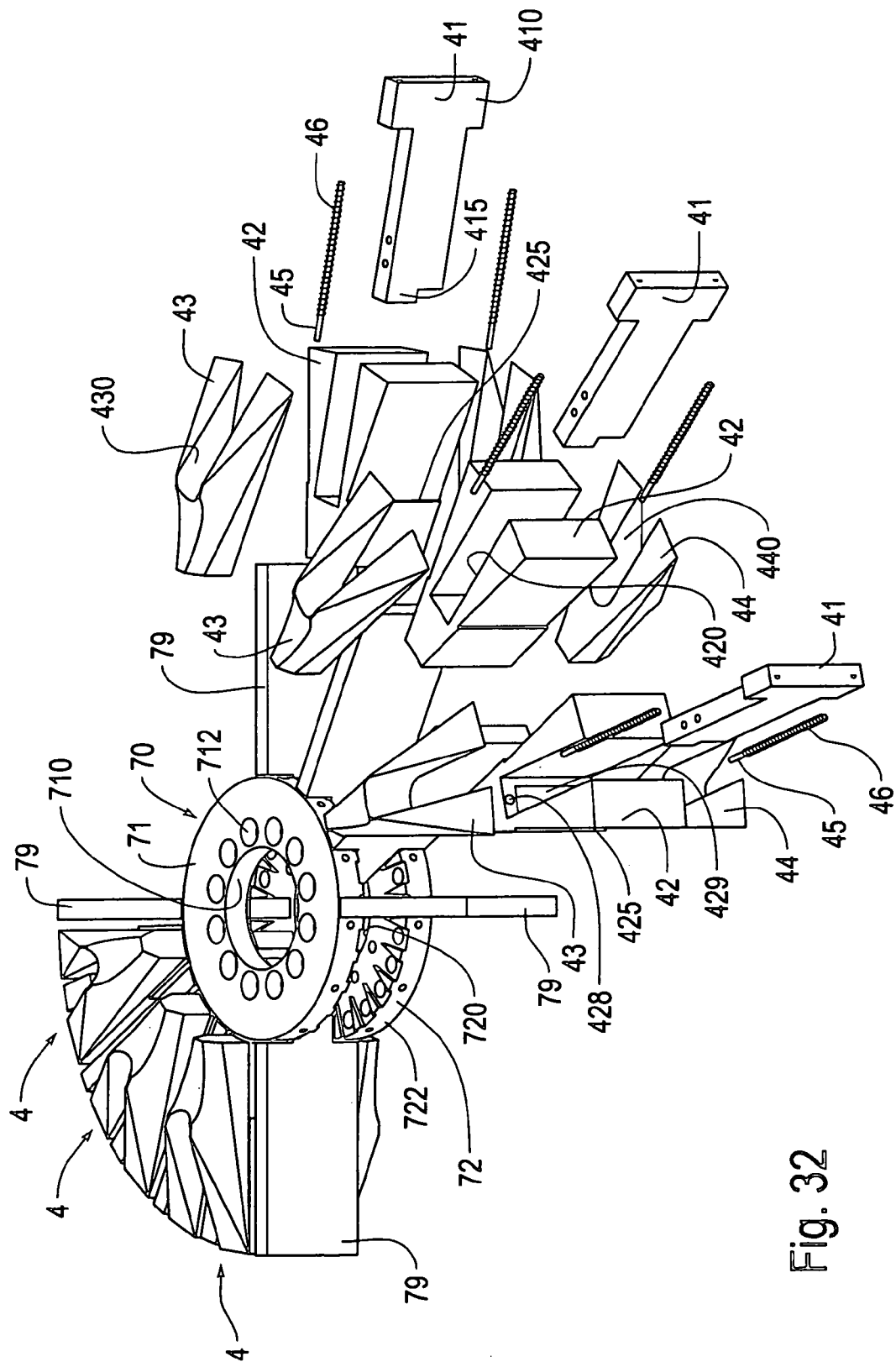
FIG. 32 is an exploded view showing a structure of a winding jig, in accordance with the fifth embodiment.

In the present embodiment, as shown in FIGS. 30 and 31, the winding jig (magazine) 7 and a rotating device 74 are used as the coil formation apparatus for forming a coil (refer to FIG. 43) for a motor formed by connecting three unipolar coils 8 in which an electric wire 88 is wound in a loop shape. The winding jig 7 has, as shown in FIGS. 30 to 32, a base holder 70 and a plurality of spools 4 disposed on an outer peripheral surface of the base holder 70. Each of the spools 4 is disposed so as to move forward and backward with respect to the base holder 70. The base holder 70 is structured such that a state in which any one spool 4 projecting from the other spools can be obtained. The rotating device 74 is structured, as shown in FIGS. 30 and 31, such that the entire winding jig 7 is rotated around an axis C of the projection and retraction movement direction of the protruding spool 4.

A description will be given in detail below of the coil formation apparatus in accordance with the present embodiment. In the winding jig 7, as shown in FIG. 32, the base holder 70 is formed in a disc shape. That is, the base holder 70 has a pair of upper and lower ring-shaped plates 71 and 72, and the ring-shaped plates 71 and 72 respectively have center through holes 710 and 720 and a plurality of positioning holes 712 and 722 disposed around a periphery of the center holes 710 and 720. The center through holes 710 and 720 and the peripheral positioning holes 712 and 722 are provided for the purpose of determining a position of engagement with the rotating device 74 described below.

Further, a pair of upper and lower ring-shaped plates 71 and 72 are connected via a separation plate 79 disposed along a direction extending radially from the centers of the ring-shaped plates 71 and 72. In the present embodiment, four separation plates 79 are disposed having a pitch of an inner angle of 30 degrees, and further, four further separation plates 79 are disposed at positions opposite and have a pitch of an inner angle of 30 degrees. Further, respective spools 4 are disposed in a space having an inner angle of about 30 degrees which is provided between the adjacent separation plates 79. In the present embodiment, three spools 4 are disposed adjacently and in an opposing position to three other spools 8, and thus, in total, six spools 4 are provided. In this case, as shown in FIG. 32, the winding jig 7 in accordance with the present embodiment is structured such that it is possible to dispose further separation plates 79 and spools 4 in an empty position on the outer peripheral surface of the disc-shaped base holder 70, and thus it is possible to provide, at a maximum, twelve of the spools 4.

Further, the spool 4 is, as shown in FIG. 32, disposed so as to freely project and retract along the axis extending radially from the center point of the base holder 70. Further, each of the spools 4 has a fan shape that expands in width along the axis mentioned above. That is, as shown in FIG. 32, on the assumption that parallel surfaces to the ring-shaped plates 71 and 72 of the base holder 70 are respectively set to a front surface and a back surface, each of the spools 4 is formed with an overall shape which is substantially fan shaped as seen from the front surface and the back surface, and has a frame main body portion 42 provided with a notch portion 420 in a center portion thereof. Further, step portions 425 are provided on both side surfaces of the frame main body portion 42, and thus it is possible to determine a position in forming the unipolar coil 8.

Forming blocks 43 and 44 for arranging the shape of the unipolar coil to be wound are detachably disposed on the front surface and the back surface of the frame main body portion 42. These forming blocks 43 and 44 are also formed in a substantially fan shape, and have notch portions 430 and 440 in center portions thereof. In this case, the forming blocks 43 and 44 are fixed to the frame main body portion 42 using a bolt (not shown). The forming blocks 43 and 44 function as the positioning apparatus described above. Further, the forming blocks 43 and 44 in accordance with the present embodiment are structured, as shown in FIG. 32, such that a thickness is increased as an inner peripheral side is approached from an outer peripheral side, and thus a height of the unipolar coil to be formed becomes greater in accordance with proximity to the inner peripheral side.

As shown in FIG. 32, the frame main body portion 42 has a through hole 429 having a rectangular shape in an axial direction extending from the notch portion 420 toward the base holder 70. In addition, rod holes 428 that are circular through holes are provided in upper and lower sides of the through hole 429. Further, the spool 4 is disposed in the base holder 70 so as to freely project and retract, by being fixed to the guide plate 41 that passes through the through hole 429 to the base holder 70. In particular, the guide plate 41 has, as shown in FIG. 32, a base end portion 415 fixed to the base holder 70, and a end portion 410, for regulating a projection position of the spool 4, having a size in a vertical direction which becomes larger in a substantially T-shaped manner. Further, the base end portion 415 of the guide plate 41 is passed through the through hole 429 that opens toward a bottom portion of the notch portion 420 in the frame main body portion 42. Further, the rod 45 attached with the spring 46 is passed through the rod holes 428 provided in the upper and lower sides of the through hole 429 in the frame main body portion 42. Further, the base end portion 415 of the guide plate 41 is fixed by being clamped between the pair of upper and lower ring-shaped plates 71 and 72 of the base holder 70. One respective end of each of two rods 45 is fixed to the ring-shaped plates 71 and 72, and another respective end thereof is fixed to the end portion 410 of the guide plate 41. Accordingly, the spool 4 is fixed so as to freely project and retract with respect to the base holder 70.

Figure 44:
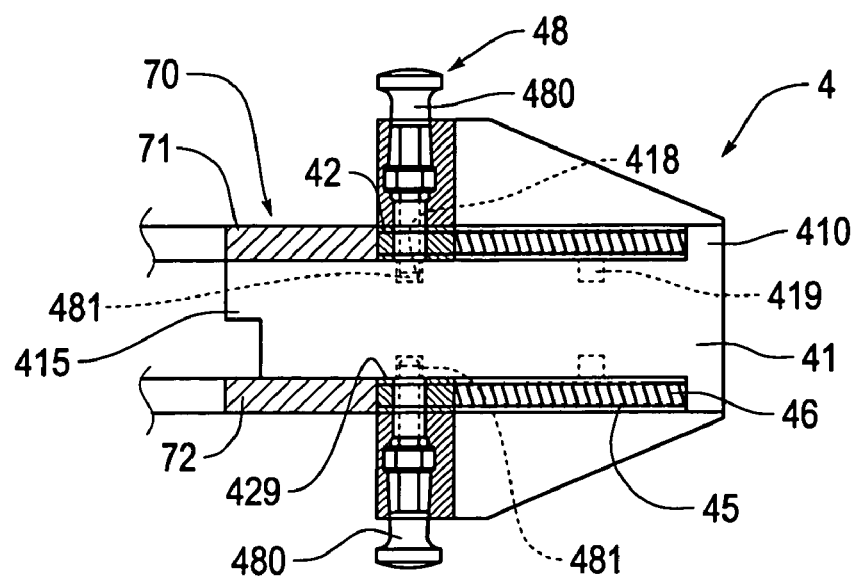
FIG. 44 is an explanatory view showing a fixing structure at a retraction position of the spool, in accordance with the fifth embodiment.
Figure 45:
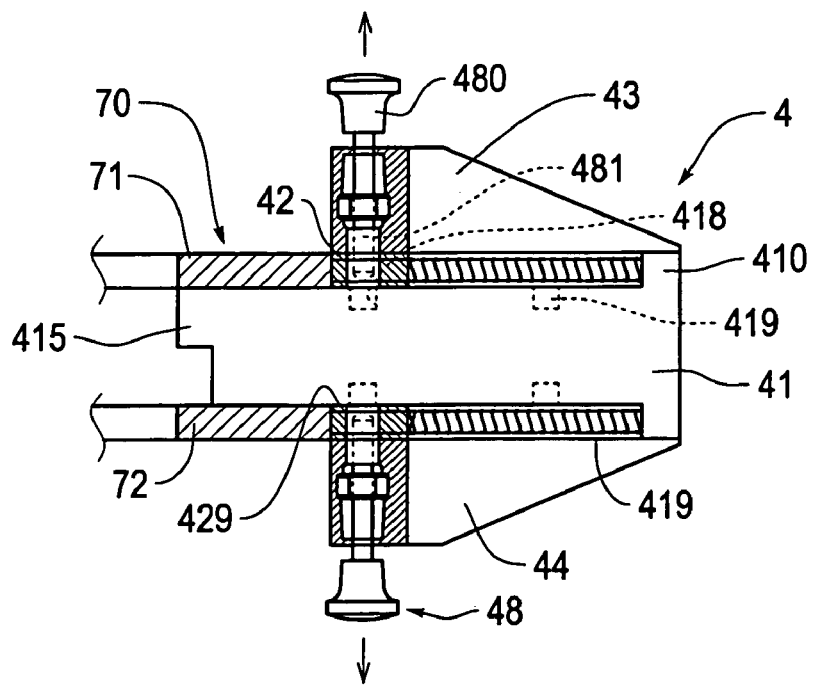
FIG. 45 is an explanatory view showing a state in which engagement of the spool with a guide plate of a positioning pin is released, in accordance with the fifth embodiment.
Figure 46:
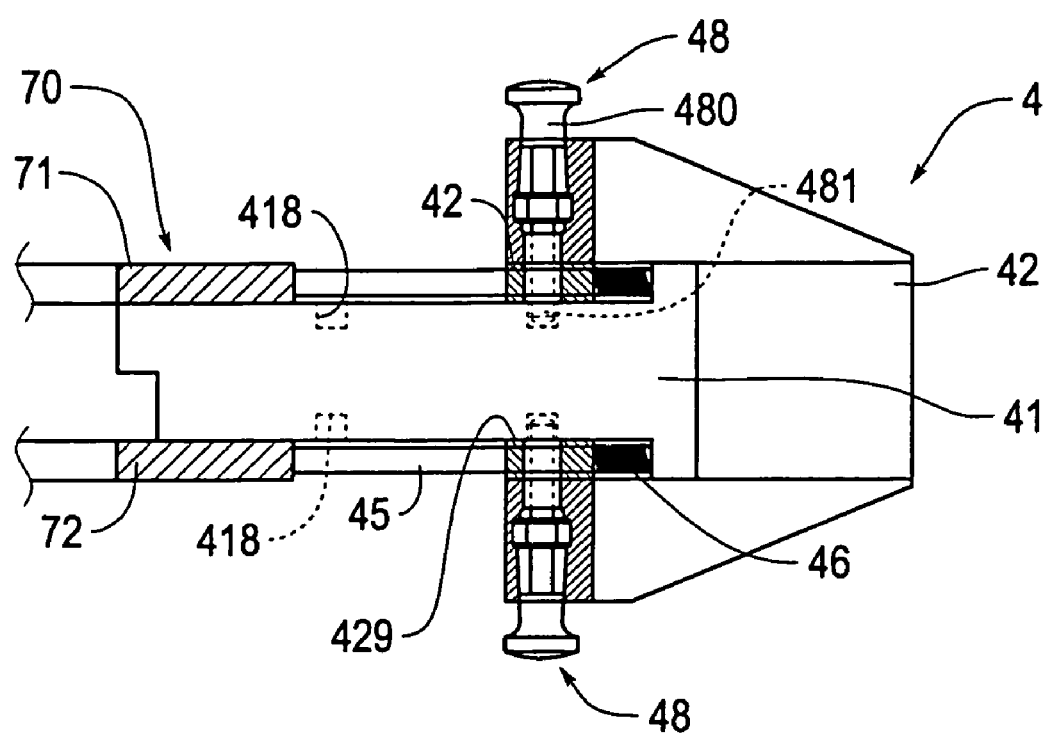
FIG. 46 is an explanatory view showing a fixing structure at a projection position of the spool, in accordance with the fifth embodiment.

As shown in FIGS. 44 to 46, the spool 44 is provided with positioning pins 48 in upper and lower sides, each of these positioning pins 48 being able to move a pin end portion 481 forward and backward by holding and operating a pin head portion 480. Further, the guide plate 41 is provided with pin holes 418 and 419 each of which can engage with the pin leading portion 481 described above. Further, as shown in FIG. 44, in a state in which the pin end portion 481 of the positioning pin 48 is engaged with the pin hole 418, it is possible to maintain a state in which the spool 4 is retracted and close to the base holder 70. Further, in the case of retracting the spool 4, the positioning pin 48 is moved backward, the state of engagement between the pin end portion 481 and the pin hole 418 is released, and the spool 4 is projected in resistance to the spring 46. Further, as shown in FIG. 46, the positioning pin 48 is again moved forward and the pin end portion 481 is engaged with the pin hole 419. Accordingly, the spool 4 is structured such that it is projected in the axial direction thereof and fixed in a position in which the spool 4 is separated from the base holder 70.

Separate plates 79 extending from the outer peripheral surface of the base plate 70 are provided at both sides of each of the spools 4 disposed in the manner described above. Further, a predetermined interval functioning as a coil holding groove described below is maintained between each separation plate 79 and each spool 4. The winding jig 7 in accordance with the present embodiment is structured such that a visible outline formed by the leading end of the spool 4 in a state when all of the spools 4 are retracted as described above is a circular shape around a center point of the base holder 70. That is, the winding jig 7 in accordance with the present embodiment is formed with a shape in which each of the spools 4 can be disposed facing the inner peripheral surface of the motor core, described below.

Next, the rotating device 74 in accordance with the present embodiment has, as shown in FIGS. 30 and 31, a straight portion 741 extending from a drive shaft (not shown) and a bent portion 76 connected to the straight portion 741 via flanges 751 and 752, and is provided with a flange 77 for connection with the winding jig 7 in a leading end of the bent portion 76. The bent portion 76 has, as shown in the same drawing, a first portion 761 extending on the same axis as the straight portion 741, a second portion 762 bent at 90 degrees from this first portion and extending therefrom, a third portion 763 which is also bent at 90 degrees from the second portion 762 and is parallel with the straight portion 741, and a fourth portion 764 which is also bent at 90 degrees from the third portion 763. Further, the connecting flange 77 described above is disposed in a leading end of the fourth portion 764.

A position of the connecting flange 77 is adjusted, as shown in FIGS. 30 and 31, when connected to the base holder 70 of the winding jig 7, so that the center points in a thickness direction and a diametrical direction of the base holder 70 come to be above an axis of the straight portion 741. A fixing position of the connecting flange 77 and the winding jig 7 in the peripheral direction is structured so as to be suitably changeable at a position where an axis C of the spool 4 and a rotation center C2 of the straight portion 741 in the rotating device 74 coincide with each other.

Next, a description will be given, with reference to FIGS. 33 to 43, of a method of forming a coil for a motor structured by connecting a plurality of unipolar coils 8, using a coil formation apparatus having the winding jig 7 and the rotating device 74. In this case, in these drawings, a description of the rotating device 74 is omitted.

Figure 33:
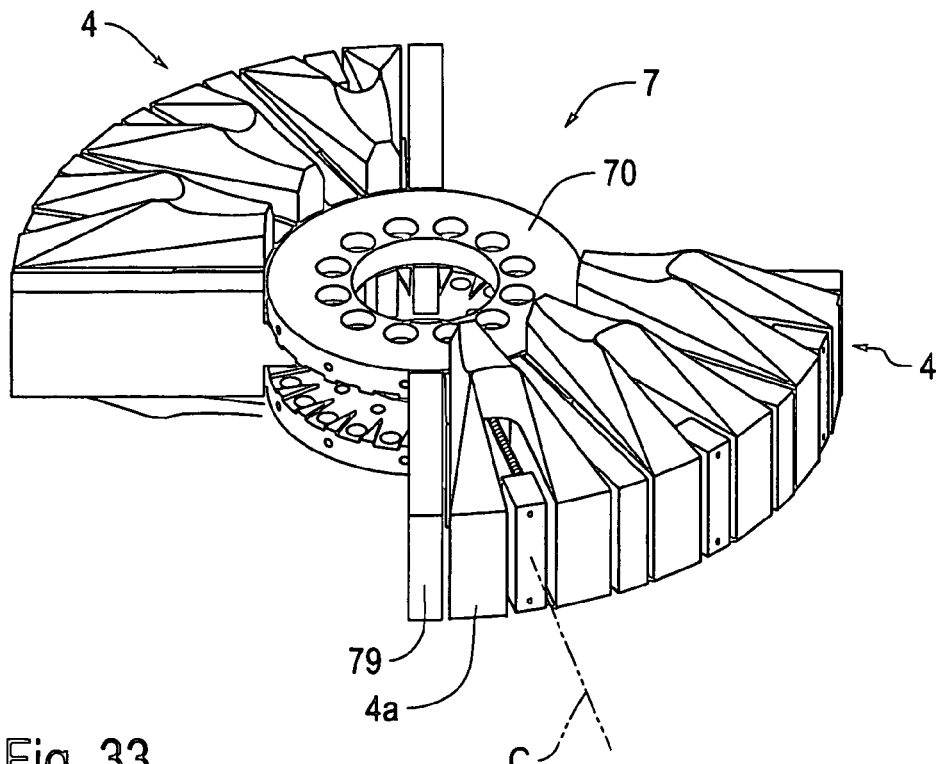
FIG. 33 is an explanatory view showing a state in which a spool of the winding jig is fully retracted, in accordance with the fifth embodiment.
Figure 34:
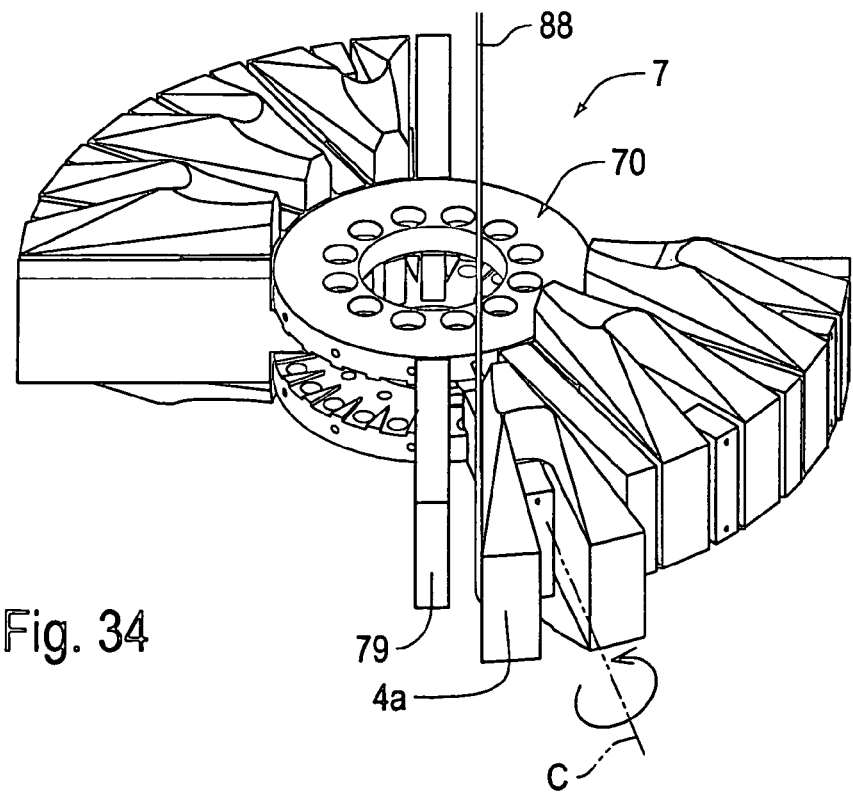
FIG. 34 is an explanatory view showing a state in which a first spool of the winding jig is projected forward, in accordance with the fifth embodiment.

First, as shown in FIG. 33, the winding jig 7 is fixed to the rotating device 74 when all of the spools 4 are in a retracted state in the winding jig 7, such that a rotation center C2 (refer to FIGS. 30 and 31) coincides with an axis C of a first spool 4a. Next, from this state, a spool projection step of moving the first spool 4a forward so that the first spool 4a projects from the other spools 4 is carried out, as shown in FIG. 34. At this time, the fixing achieved by the positioning pin 48 (FIGS. 44 to 46) fixing the spool 4a at the retracted position is released, the spool 4a is projected forward against the spring 46, and the spool 4a is fixed again at the projection position by the positioning pin 48.

Further, as shown in FIG. 34, the electric wire 88 is supplied from one direction, being the upper direction, and the leading end of the electric wire 88 is fixed to the winding jig 7. A fixing method can employ a method of fixing to a determined position, or a method of connection to a chosen position of the winding jig 7, using a specific fixing apparatus. The present embodiment employs the latter method.

Figure 35:
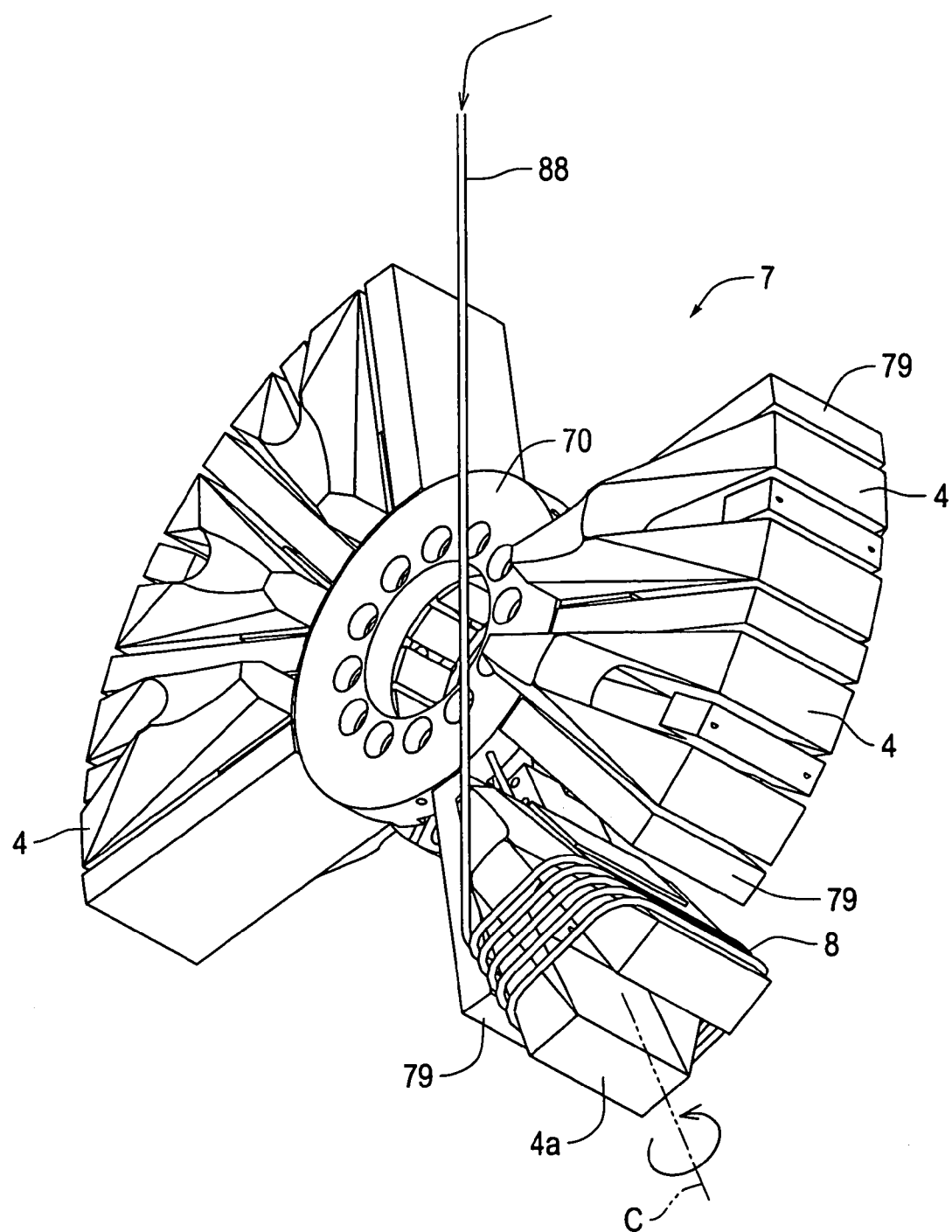
FIG. 35 is an explanatory view showing a state in which an electric wire is wound by rotating the winding jig around an axis of the first spool.
Figure 36:
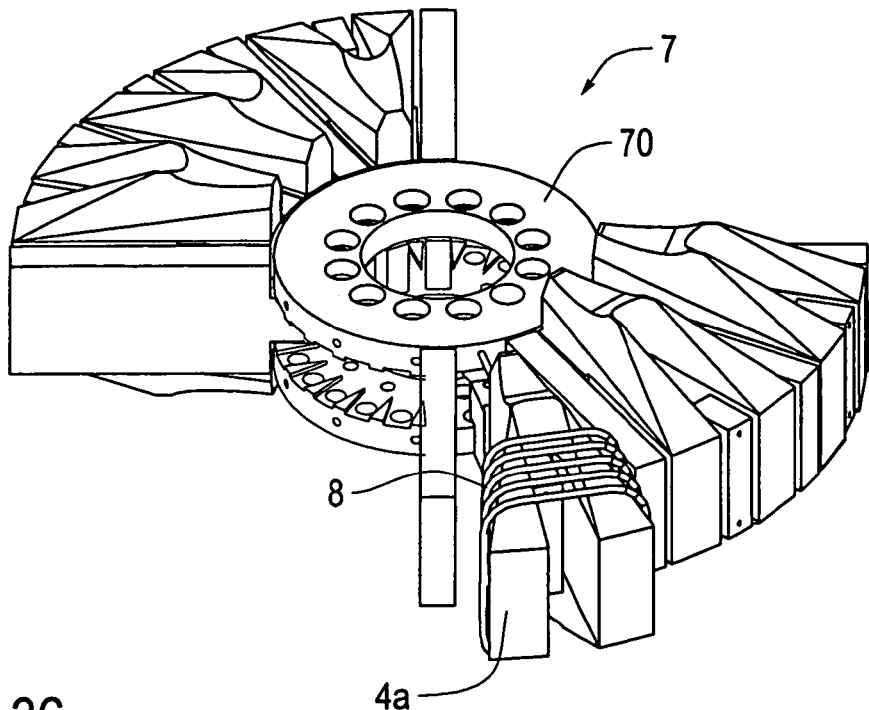
FIG. 36 is an explanatory view showing a state in which winding of the electric wire around the first spool is completed, in accordance with the fifth embodiment.
Figure 37:
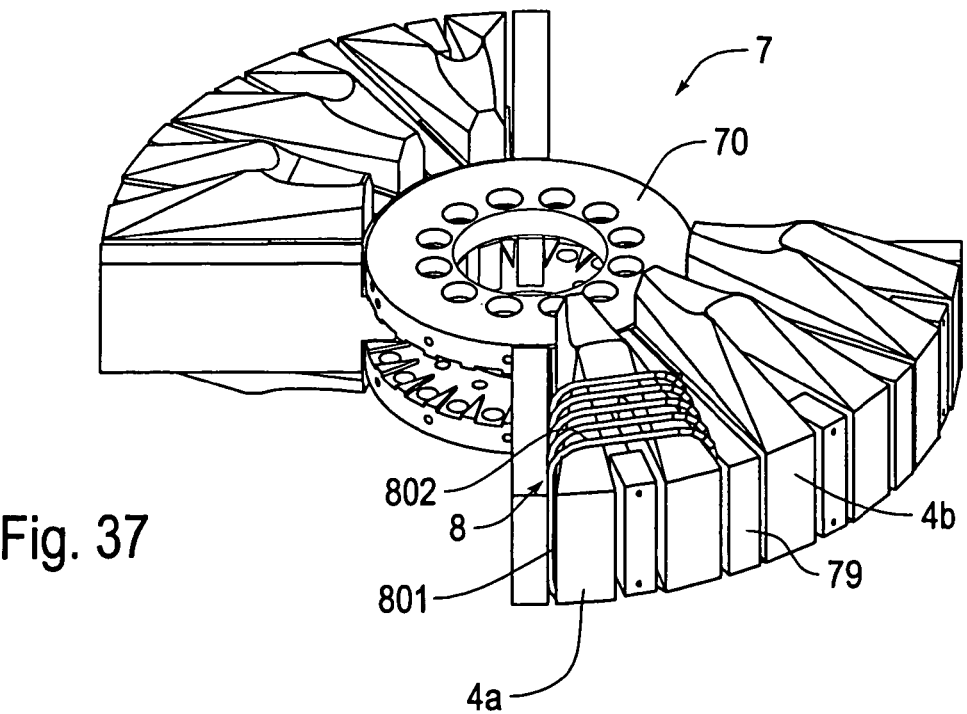
FIG. 37 is an explanatory view showing a state in which the first spool is retracted, in accordance with the fifth embodiment.

Next, as shown in FIGS. 34 and 35, a winding step is carried out in which the electric wire 88 is supplied to the protruding spool 4a from one direction, while the rotating device 74 is driven and the whole of the winding jig 7 rotated around the axis C of the spool 4a. Accordingly, as shown in FIG. 36, the electric wire 88 is wound around the protruding spool 4a, and the forming of the first unipolar coil 8 is completed. Next, as shown in FIG. 37, a spool retraction step is carried out in which the first spool 4a on which the unipolar coil 8 is formed is retracted. At this time, the spool 4a is fixed at a retraction position by operating the positioning pin 48 again (FIGS. 44 to 46).

As shown in the same drawing, the unipolar coil 8 formed around the periphery of the spool 4a enters a state in which the coil end portions 802 positioned in the upper and lower sides thereof are exposed to the front and back sides of the spool 4, and the coil inserting portions 801 positioned in the right and left sides are accommodated in the space between the separation plate 79 and the spool 4.

Figure 38:
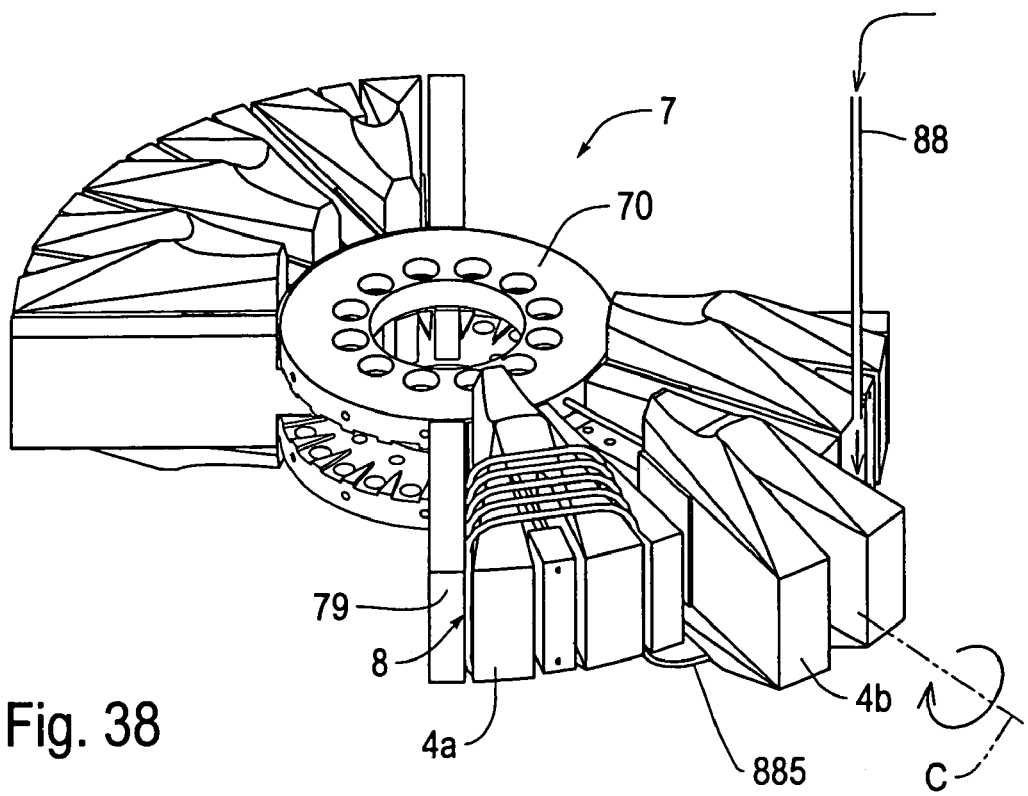
FIG. 38 is an explanatory view showing a state in which a second spool of the winding jig is projected forward, in accordance with the fifth embodiment.

Next, as shown in FIG. 38, a second spool 4b adjacent to the first spool 4a on which the unipolar coil 8 is formed is projected forward along the axis C so as to project from the other spools 4, and is fixed at the projection position in the same manner as described above. Before or after this spool projection step, the position of engagement between the winding jig 7 and the rotating device 74 is changed, and the rotation center of the rotating device 74 is placed so as to coincide with the axis of the second spool 4b. As shown in the same drawing, a crossover wire 885 connecting from the unipolar coil 8 held by the first spool 4a is passed over a lower side of the second spool 4b, and the electric wire 88 connected thereto is supplied from one direction, being the upper direction, in the same manner as just before.

Figure 39:
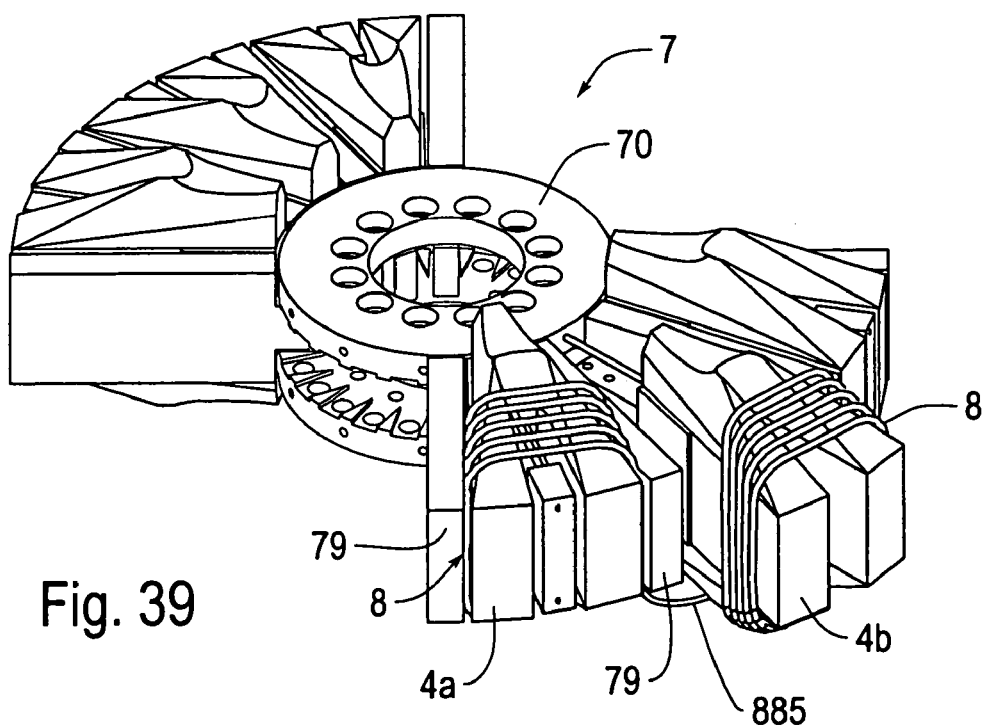
FIG. 39 is an explanatory view showing a state in which winding of the electric wire is completed by rotating the winding jig around an axis of the second spool, in accordance with the fifth embodiment.
Figure 40:
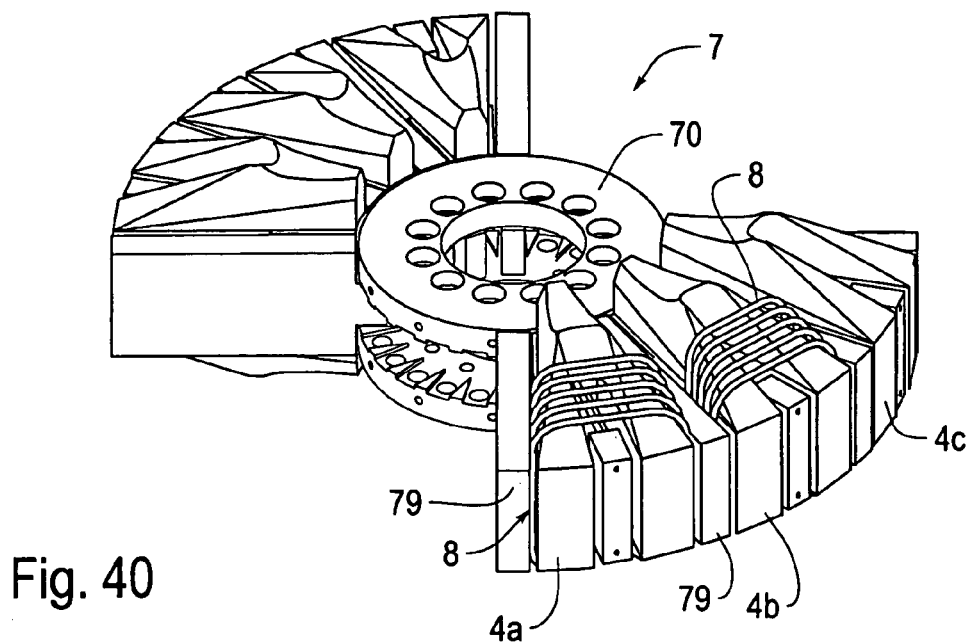
FIG. 40 is an explanatory view showing a state in which the second spool is retracted, in accordance with the fifth embodiment.

Next, as shown in FIGS. 38 and 39, the winding step is carried out in which the electric wire 88 is supplied to the protruding spool 4b from one direction, and the whole of the winding jig 7 is rotated around the axis C of the spool 4b. A rotation direction at this time is opposite to that in the case of the first spool 4a. Accordingly, as shown in FIG. 40, the electric wire 88 is wound around the protruding spool 4b, and the forming of the second unipolar coil 8 having the opposite winding direction to that of the first unipolar coil 8 is completed. Next, as shown in FIG. 40, the second spool 4b on which the unipolar coil 8 is formed is retracted, and is fixed at the retraction position in the same manner as described above. As shown in the same drawing, the second unipolar coil 8 formed around the periphery of the spool 4b also enters a state in which the coil end portions 802 positioned at the upper and lower sides of the loop are exposed to the front and back sides of the spool 4, and the coil inserting portions 801 positioned at the right and left sides are accommodated in the space between the separation plate 79 and the spool 4.

Figure 41:
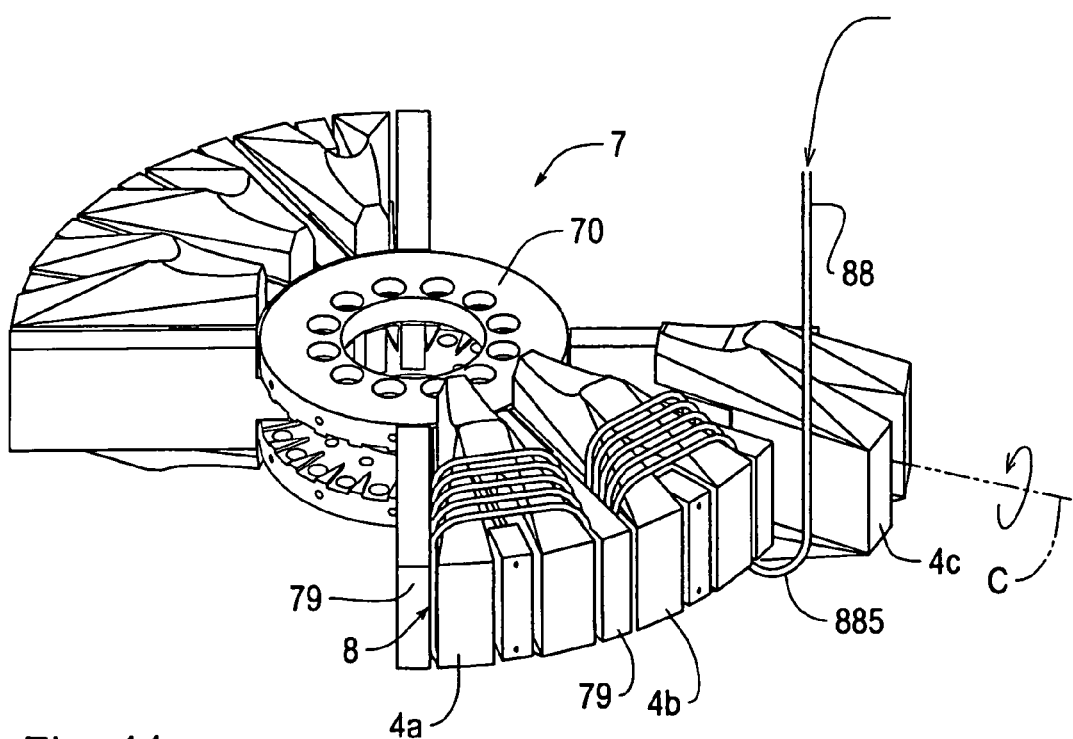
FIG. 41 is an explanatory view showing a state in which a third spool of the winding jig is moved forward, in accordance with the fifth embodiment.

Next, as shown in FIG. 41, a third spool 4c adjacent to the second spool 4b is projected forward along the axis C so as to project outward from the other spools 4, and is fixed at the projection position in the same manner as described above. Further, in this case also, before or after the spool projection step, the position of engagement between the winding jig 7 and the rotating device 74 is changed, and the rotation center C2 (FIGS. 30 and 31) of the rotating device 74 is placed so as to coincide with the axis C of the third spool 4c. As shown in the same drawing, the electric wire 88 connected to the crossover wire 885 extending from the unipolar coil 8 held by the second spool 4b is supplied from one direction, being the upper direction, in the same manner as described above.

Figure 42:
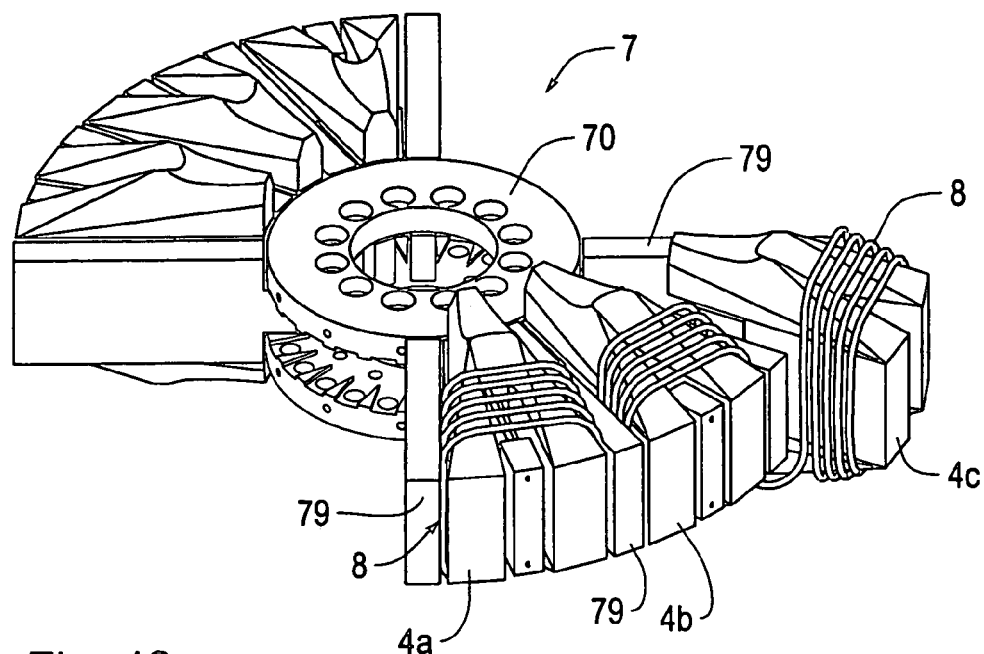
FIG. 42 is an explanatory view showing a state in which winding of the electric wire is completed by rotating the winding jig around an axis of the third spool, in accordance with the fifth embodiment.
Figure 43:
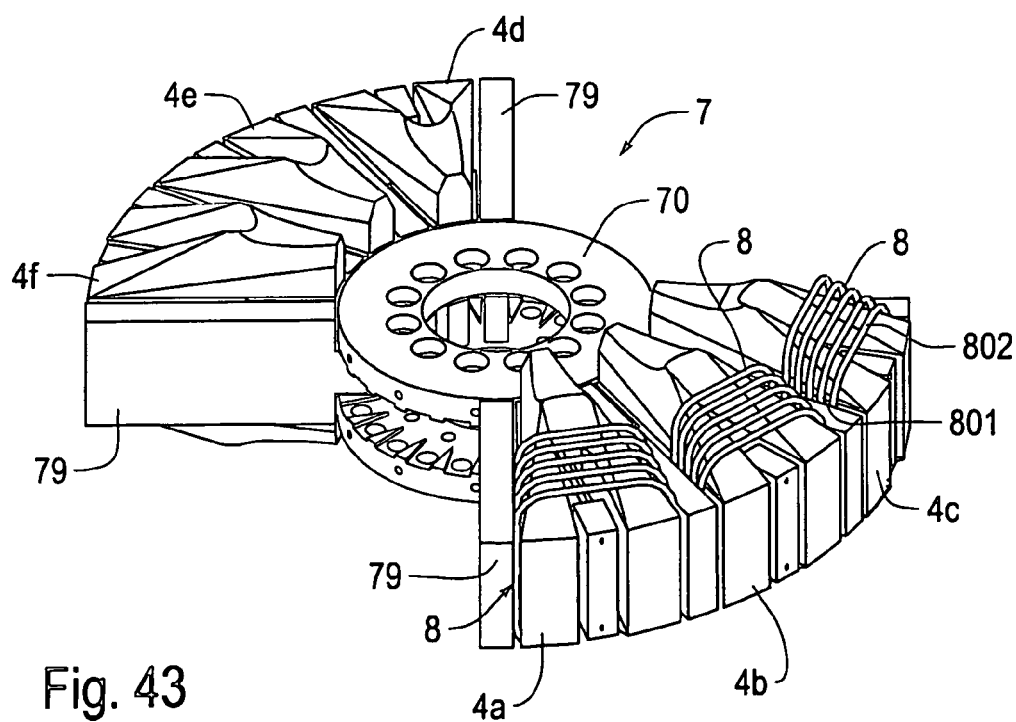
FIG. 43 is an explanatory view showing a state in which the third spool is retracted, in accordance with the fifth embodiment.

Next, as shown in FIGS. 41 and 42, the winding step in which the electric wire 88 is supplied to the protruding spool 4c from one direction, while the whole of the winding jig 7 is rotated around the axis C of the spool 4c. A rotation direction at this time is opposite to that in the case of the second spool 4b. Accordingly, as shown in FIG. 42, the electric wire 88 is wound around the protruding spool 4c, and the forming of the third unipolar coil 8 having the opposite winding direction to that of the second unipolar coil 8 is completed. Next, as shown in FIG. 43, the third spool 4c on which the unipolar coil 8 is formed is retracted, and is fixed at the retraction position in the same manner as described above.

As shown in the same drawing, the coil inserting portion 801 of the third unipolar coil 8 formed around the periphery of the spool 4c is also in a state of being accommodated in the space between the separation plate 79 and the spool 4. Accordingly, the coil in which three unipolar coils 8 are connected such that the winding directions are alternately reversed is completed. Next, as shown in FIG. 43, it is possible to form a coil in which three unipolar coils 8 are connected such that the winding directions are alternately reversed, by following the same procedure as described above with respect to three spools 4d to 4f opposite to the three spools 4a to 4c which form the above described coil.

As described above, in the coil forming method in accordance with the present embodiment, the winding jig 7 structure as described above having the base holder 70 and the spool 4, and the rotating device 74 are employed. Further, as described above, the spool projection step, the winding step and the spool retraction step are sequentially carried out with respect to each of the spools. In this case, the winding step is carried out by rotating the whole of the winding jig around the axis C of the protruding spool 4. Accordingly, as described above, it is possible to supply the electric wire 88 from one direction, and it is possible to form the unipolar coil 8 on the spool 4 without causing twisting of the electric wire 88.

The winding step is carried out after the spool projection step, and the spool retraction step is carried out after the winding step. That is, in the case of changing the spool 4 subject to the winding step, it is possible to change the spool 4 by carrying out the forward movement and the backward movement in the spool projection step and the spool retraction step, and it is not necessary to specially provide a space for supplying the electric wire between the adjacent spools 4. Accordingly, it is possible to restrict the length of the crossover wire 885 between the obtained unipolar coils 8 such that the length is sufficiently short.

In the present embodiment, each of the spools 4 of the winding jig 7 is formed with the shape that is substantially a fan shape as described above, and the forming blocks 43 and 44 are disposed on the front surface and the back surface thereof. The forming blocks 43 and 44 increase in thickness in accordance with the proximity to the inner side from the outer side, as described above. Accordingly, in the unipolar coil 8 wound around the spool 4, the shape of a plurality of electric wire loops structuring the unipolar coil 8 is changed along the axis C of the spool 4.

That is, a plurality of electric wire loops structuring the unipolar coil 8 increase in width along the fan-shaped spool 4 in accordance with proximity with the outer side, and the height of the electric wire loops is reduced along the shape of the forming blocks 43 and 44. Accordingly, as described below, it is possible to dispose of the coil end portion 802 when attaching the coil to the motor core at an optimum state. By employing a structure in which the width increases from the inner side in the diametrical direction toward the outer side, and the height in the axial direction is reduced from the inner side in the diametrical direction toward the outer side, it is possible to prevent each of the electric wires (the coils) structuring the unipolar coil 8 from being shifted when taking up the electric wire 88.

The winding jig 7 in accordance with the present embodiment is structured such that the visible outline formed by the leading end of the spools 4 when all of the spools 4 are in a retracted state has a circular column shape and the respective spools 4 can be positioned so as to face toward the inner peripheral surface of the motor core. The separation plates 79 extending from the outer peripheral surface of the base holder 70 are provided at both sides of each of the spools 4. Further, the space between the separation plate 79 and the spool 4 functions as a coil holding groove. Further, an attachment operation of each of the unipolar coils 8 to the motor core in accordance with the linear movement can be achieved along the coil holding groove, as shown in the second embodiment described below.

Figure 47:
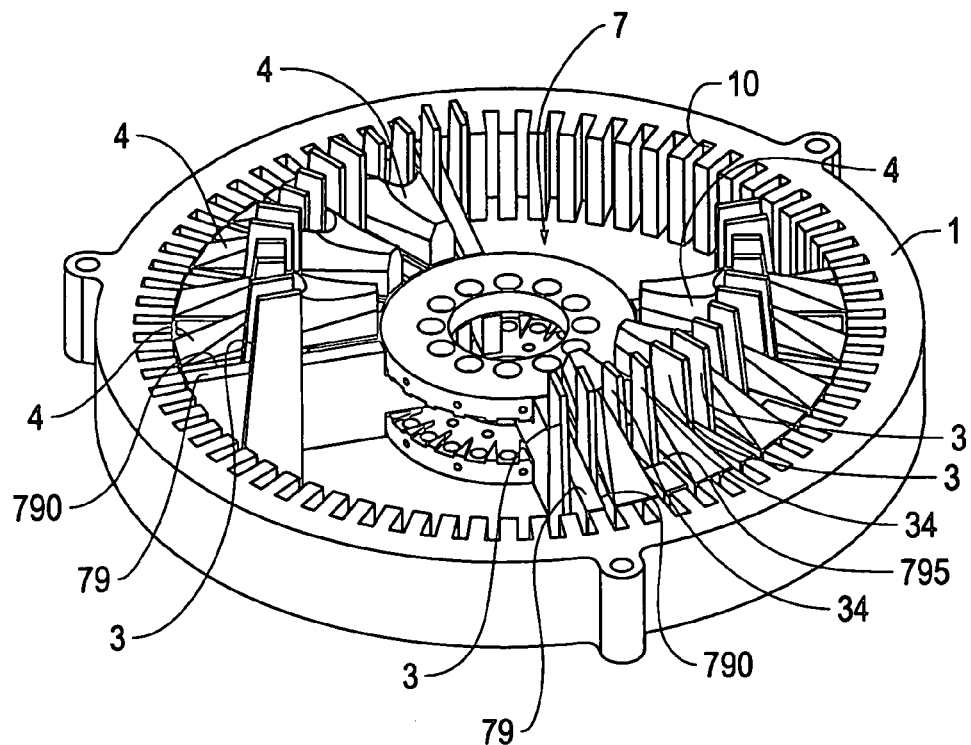
FIG. 47 is an explanatory view showing a state in which the winding jig is disposed in an inner portion of the motor core, in accordance with the fifth embodiment.
Figure 48:
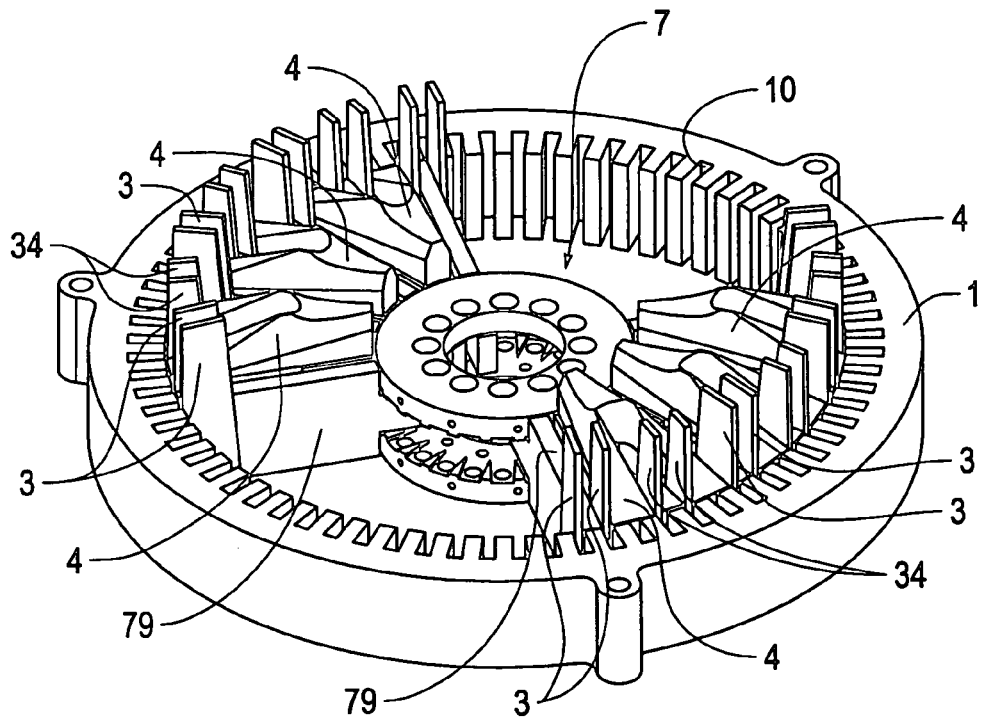
FIG. 48 is an explanatory view showing a state in which an insertion blade and a preliminary blade inserted into the winding jig are moved forward, in accordance with the fifth embodiment.

Next, in the present embodiment, an example will be shown of a method of directly inserting the coil formed using the coil formation apparatus described above into the motor core from the winding jig 7. In the present embodiment, as shown in FIGS. 47 and 48, the coil (refer to FIG. 43) is inserted and disposed in the slot 10 provided on the inner peripheral surface of the ring-shaped stator core 1. It should be noted that, in the present embodiment, in order to clarify the movement of the insertion blade 3, and the like, described below, an illustration of the coil (the unipolar coil 8) is omitted.

The motor structured using the stator core 1 is the three-phase DC brushless motor. Further, the stator core 1 in accordance with the present embodiment is also manufactured by laminating ring-shaped electromagnetic steel plates, and has the slot 10 for inserting the coil on the inner peripheral surface thereof, as shown in FIGS. 47 and 48. In the present embodiment, seventy two slots 10 are provided in the stator core 1, in order to dispose a total of thirty six unipolar coils 8. Further, the number of the unipolar coils 8 corresponding to one phase is twelve. In accordance with the present embodiment, as described above, two sets of coils connecting three unipolar coils 8 are manufactured by one winding jig 7, and these are simultaneously attached to the stator core 1. By carrying out this operation six times, all the necessary unipolar coils 8 can be attached to the stator core 1.

A more specific description will be given of this operation. First, as shown in FIG. 47, the winding jig 7 is disposed in the inner portion of the stator core 1 so that the coil holding groove 790 formed between the spool 4 in the winding jig 7 and the separation plate 79 faces toward the slot 10 of the stator core 1. As shown in FIG. 47, the insertion blade 3 is inserted into the coil holding groove 790 of the winding jig 7. Further, the notch portion 420 provided in the frame main body portion 42 of the spool 4 in the winding jig 7 and the notch portions 430 and 440 (refer to FIG. 32) provided in the upper and lower forming blocks 43 and 44 form a preliminary forming groove 795 for inserting the preliminary formation blade 34.

As shown in FIG. 48, at the same time as moving the insertion blade 3 forward within the coil holding groove 790 in the direction from the center toward the outer periphery, the preliminary formation blade 34 is moved forward within the preliminary forming groove 795 in the direction toward the outer periphery from the center. Accordingly, the unipolar coil 8 is pressed by the insertion blade 3, and moves substantially linearly from the coil holding groove 790 to the slot 10 of the stator core 1. Further, the upper and lower coil end portions 802 (FIG. 43) protruding from the stator core 1 in the unipolar coil 8 are pressed by the preliminary formation blade 34 so as to be deformed outwards, thus executing the preliminary forming. The forward motion of the insertion blade 3 and the preliminary formation blade 34 is simultaneously applied to all of six unipolar coils 8, and six unipolar coils 8 are simultaneously inserted into the slots 10 of the stator core 1.

Next, in the present embodiment, the second preliminary forming is carried out using the pair of upper and lower formers 66 (refer to FIG. 12), which have the same structure as that of the first embodiment. The former 66 has the ring shape as described above, and has the forming surface 660 for arranging the coil in the desired shape, in the side facing to the stator core 1. Further, the notch portion 665 for preventing interference with the insertion blade 3 and the preliminary formation blade 34 is provided in each of the formers 66. Further, the structure is made such that it is possible to press the former to the stator core 1 while maintaining the state in which the insertion blade 3 and the preliminary formation blade 34 are moved forward.

The pair of upper and lower formers 66 having the structure described above are respectively moved forward from the upper and lower sides toward the stator core 1 and are pressed to the stator core 1. Accordingly, the second preliminary forming is carried out such that the coil end portions 802 protruding from the upper and lower sides of the stator core 1 in each of the six unipolar coils 8, disposed in the stator core 1 in the manner described above, tilt toward the stator core 1.

Next, in accordance with the present embodiment, the coil formation apparatus described above is used, and two sets of coils in which three unipolar coils 8 are newly connected on the winding jig 7 are formed. Further, in the same manner as described above, the direct movement of the coil to the stator 1 from the winding jig 7, the preliminary forming and the second preliminary forming are carried out. In total, thirty six unipolar coils 8 are attached to the stator core 1 by repeating the operation six times. Further, the forming by the former which is carried out as the final second preliminary forming is applied to all of the thirty six unipolar coils 8, and becomes the main forming step for arranging the shape of the entire coil.

In the manner described above, the total of thirty six unipolar coils 8 are inserted and disposed into the stator core 1. In this case, in the present embodiment, the operations from the forming of the six unipolar coils to the second preliminary forming are carried out as a series of operations, and these operations are repeated six times. However, it is possible to increase efficiency using plural sets of winding jigs 7. Further, it is possible to promote further rationalization of the steps by increasing the number of the spools 4 in the winding jig 7 from six to twelve, and moving the twelve unipolar coils 8 to the stator core 1 at one time.

As described above, in accordance with the present embodiment, it is also possible to easily and stably carry out the so-called linear inserting method of linearly moving the coil, by utilizing the winding jig 7 and the insertion blade 3. That is, it is possible to linearly insert the unipolar coil 8 into the slot 10 without changing the position of the unipolar coil 8. Accordingly, it is not necessary to increase the length in the vertical direction of the coil more than necessary.

In accordance with the present embodiment, as described above, it is possible to directly move the coil from the spool 4 on which the coil is formed, to the stator core 1. Further, it is not necessary to move the coil from the spool to another coil transfer device after forming the coil, and it is possible to attach the coil to the motor core in an extremely effective manner. This is because the structure of the winding jig 2 is an outstanding structure as described above. Further, since it is possible to directly insert the coil into the stator core 1 from the winding jig 7, it is possible to easily carry out the movement of the coil even when the length of the crossover wire connecting the unipolar coils 8 to each other is short.

What is claimed is:

1. A method of manufacturing a motor having a ring-shaped motor core provided with a plurality of slots on an inner peripheral surface and coil groups of a plurality of phases, wherein the coil group in each of the phases is structured from a plurality of unipolar coils corresponding to one pole, each of the unipolar coils are inserted and disposed in the motor core by being passed through two of the plurality of slots so as to straddle the two of the plurality of slots, and the unipolar coils belonging to different phases of coil groups are overlapped with each other in portions of respective coil end portions when attached to the motor core, comprising:

forming the unipolar coil, the unipolar coil having two coil inserting portions and having the coil end portions at two positions disposed in an outer portion of the motor core so as to connect the coil inserting portions, into a shape such that a size in a height direction parallel to the coil inserting portions changes so as to be larger in an inner peripheral side, corresponding to a diametrical direction of the motor core along a direction of a winding axis center, than an outer peripheral side by winding a wire a plurality of times;

disposing the unipolar coil such that the two coil inserting portions in the unipolar coil respectively face toward inner peripheral opening portions of the two of the plurality of slots and are substantially parallel to an axial direction of the motor core; and inserting the two coil inserting portions of the unipolar coil into the two of the plurality of slots by moving the unipolar coil toward the motor core substantially linearly while holding the unipolar coil—so that protrusion dimensions at both ends of the unipolar coil protruding from both end surface positions in the axial direction of the motor core are maintained substantially the same.

2. The method according to claim 1, wherein the unipolar coil is held by a coil holding mechanism at a time of or after forming the coil, the unipolar coil is disposed such that the two coil inserting portions respectively face toward the inner peripheral opening portions of the two of a plurality of slots and are substantially parallel to the axial direction of the motor core, and the unipolar coil is moved substantially linearly toward the motor core so as to separate from the coil holding mechanism.

3. The method according to claim 2, wherein the unipolar coil is inserted using a magazine, having coil holding grooves capable of clamping the two coil inserting portions of the unipolar coil, as the coil holding mechanism, in using the magazine:

the two coil inserting portions of the unipolar coil are disposed in the coil holding grooves of the magazine;

the magazine is disposed in the inner portion of the motor core; and at a time of moving the unipolar coil, protrusion dimensions at both of the ends of the unipolar coil are maintained substantially the same, owing to a friction force generated between the two coil inserting portions and the coil holding grooves based on an elastic force of the two coil inserting portions.

4. The method according to claim 3, wherein a positioning apparatus supporting the coil end portion of the unipolar coil from an inner side thereof is provided on both surfaces of the magazine, and when inserting the unipolar coil, movement of the unipolar coil is started from a state in which the coil shape is maintained by the positioning apparatus.

5. The method according to claim 4, wherein the positioning apparatus is provided so as to freely move forward and backward with respect to the magazine, and when inserting the unipolar coil, the shape of the unipolar coil is constantly maintained by the positioning apparatus by moving the positioning apparatus in correspondence to a movement of the unipolar coil.

6. The method according to claim 3, wherein the unipolar coil is moved from the coil holding groove to the two of the plurality of slots of the motor core by bringing a coil insertion mechanism into contact with the unipolar coil so as to move the contact portion forward in a direction from a center of the magazine toward an outer periphery.

7. The method according to claim 6, wherein the coil insertion mechanism includes an insertion blade capable of being inserted into the coil holding groove of the magazine, and the coil inserting portion is moved from the coil holding groove to the two of the plurality of slots of the motor core by inserting the insertion blade into the coil holding groove and moving the insertion blade forward in a direction from the center toward the outer periphery.

8. The method according to claim 6, wherein the coil insertion mechanism includes a pair of divided insertion blades which can be inserted into the coil holding groove from a respective front surface side and a back surface side of the magazine, and the coil inserting portion is moved from the coil holding groove to the two of the plurality of slots of the motor core by inserting the pair of divided insertion blades into the coil holding groove from the respective front surface side and the back surface side of the magazine, contacting the divided insertion blades with the coil inserting portion, and moving forward the contact portion in the direction from the center toward the outer periphery.

9. The method according to claim 6, wherein the coil insertion mechanism includes a pair of divided insertion hooks which are divided according to the front surface side and the back surface side of the magazine, and the coil inserting portion is moved from the coil holding groove to the two of the plurality of slots of the motor core by bringing the pair of divided insertion hooks into respective contact with the coil end portions protruding to the front surface side and the back surface side of the magazine and moving forward the divided insertion hooks from the center of the magazine in the direction toward the outer periphery.

10. The method according to claim 6, wherein pressing and deforming the coil end portions is executed by moving forward a preliminary formation mechanism disposed between adjacent coil holding grooves from the center of the magazine in the direction toward the outer periphery, at the same time as or after moving the coil inserting portion from the coil holding groove to the two of the plurality of slots.

11. The method according to claim 10, wherein a preliminary forming groove is provided in the magazine parallel to the coil holding groove, a preliminary formation blade which can be inserted into the preliminary forming groove is employed as the preliminary formation mechanism, and the pressing and deforming of the coil end portion is carried out by inserting the preliminary formation blade into the preliminary forming groove and moving the preliminary formation blade forward from the center in the direction toward the outer periphery.

12. The method according to claim 11, wherein the preliminary formation mechanism includes a pair of divided preliminary formation blades which are divided according to the front surface side and the back surface side of the magazine, and the pressing and deforming of the coil end portion is carried out by moving forward the pair of divided preliminary formation blades at the front surface side and the back surface side of the magazine from the center of the magazine in the direction toward the outer periphery.

13. The method according to claim 12, wherein the coil insertion mechanism includes a pair of divided insertion blades which are divided according to the front surface side and the back surface side of the magazine, and the divided insertion blades and the divided preliminary formation blades are structured so as to interlock.

14. The method according to claim 12, wherein forming the coil end portion is executed by pressing a former having a forming surface for arranging the coil end portion in a desired shape to the motor core, after repeating the coil insertion and the pressing and deforming of the coil end portion a plurality of times.

15. The method according to claim 14, wherein a notch portion for preventing the coil insertion mechanism and the preliminary formation mechanism from interfering with each other is provided in the former, and the former is pressed to the motor core while maintaining a state in which the coil insertion mechanism and the preliminary mechanism are moved forward.

16. The method according to claim 3, wherein a winding jig is employed in forming the unipolar coil, the winding jig having a base holder and a plurality of spools disposed radially on an outer peripheral surface of the base holder, and in which the spools are disposed so as to freely move forward and backward with respect to the base holder, further comprising the steps of:

projecting forward one spool among the plurality of spools such the one spool projects from the other spools;

supplying an electric wire to the one spool from one direction and rotating the entire winding jig around an axis of the one spool so as to wind the electric wire around the spool, thereby forming the unipolar coil; and retracting the one spool forming the unipolar coil, wherein the projecting, supplying and retracting are sequentially applied to the adjacent spools repeatedly, the supplying is carried out by sequentially reversing a rotational direction of the winding jig, and when inserting the two coil inserting portions the winding jig is used as the magazine, the winding jig holding the unipolar coil is disposed in an inner portion of the motor core, and each of the unipolar coils is directly moved to the slot of the motor core from the spool.

17. The method according to claim 16, wherein the base holder in the winding jig is formed in a disc shape, and the plurality of spools are disposed so as to be capable to forward and backward movement along an axis extending radially from a center point of the base holder.

18. The method according to claim 16, wherein each of the spools in the winding jig has a fan shape with a width that expands along the axis.

19. The method according to claim 16, wherein each of the spools in the winding jig is detachably provided with a forming block for arranging the shape of the wound unipolar coil.

20. The method according to claim 16, wherein in the winding jig, a visible outline formed by a leading end of the spools in a state in which all of the spools are retracted is a circular shape having a center constituted by a center point of the base holder.

21. The method according to claim 16, wherein separation plates extending from the outer peripheral surface of the base holder are disposed at both sides of each of the spools, and a predetermined interval is maintained between the separation plates and the spools.

22. The method according to claim 1, wherein the unipolar coil is formed in a substantially quadrangular shape having four periphery lines comprising substantially linear portions for the coil inserting portions and the coil end portions, as seen from a direction of the winding axis center, with a hypothetical surface formed by connecting adjacent linear portions of the coil end portions having a taper shape which is inclined with respect to the winding axis center.

23. The method according to claim 1, wherein only the unipolar coil is inserted into the two of the plurality of slots of the motor core.

24. The method according to claim 1, wherein the motor core is a stator core.

25. The method according to claim 1, wherein the motor is a three-phase DC brushless motor, and the unipolar coils of one phase are simultaneously inserted into two of the plurality of slots of the motor core.

\* \* \* \* \*